US008898056B2

(12) United States Patent  
Chan et al.

(10) Patent No.: US 8,898,056 B2
(45) Date of Patent: Nov. 25, 2014

(54) SYSTEM AND METHOD FOR GENERATING A SEPARATED SIGNAL BY REORDERING FREQUENCY COMPONENTS

(75) Inventors: Kwok-Leung Chan, San Diego, CA (US); Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1180 days.

(21) Appl. No.: 12/281,245

(22) PCT Filed: Feb. 27, 2007

(86) PCT No.: PCT/US2007/004966
§ 371 (c)(1),
(2), (4) Date: Dec. 15, 2008

(87) PCT Pub. No.: WO2007/103037
PCT Pub. Date: Sep. 13, 2007

(65) Prior Publication Data
US 2009/0254338 A1 Oct. 8, 2009

Related U.S. Application Data

(60) Provisional application No. 60/777,900, filed on Mar. 1, 2006, provisional application No. 60/777,920, filed on Mar. 1, 2006.

(51) Int. Cl.
*G10L 15/20* (2006.01)
*G10L 21/0272* (2013.01)
*H04L 25/03* (2006.01)

(52) U.S. Cl.
CPC ....... *G10L 21/0272* (2013.01); *H04L 25/03159* (2013.01)
USPC ............................ 704/205; 704/206; 704/233

(58) Field of Classification Search
CPC .................. G10L 21/0272; G10L 2021/02166
USPC ................................................. 704/205, 233
See application file for complete search history.

(56) References Cited

U.S. PATENT DOCUMENTS

| | | |
|---|---|---|
| 4,649,505 A | 3/1987 | Zinser, Jr. et al. |
| 4,912,767 A | 3/1990 | Chang |

(Continued)

FOREIGN PATENT DOCUMENTS

| | | |
|---|---|---|
| CN | 1809105 A | 7/2006 |
| DE | 19849739 | 5/2000 |

(Continued)

OTHER PUBLICATIONS

Buchner et al. "A Generalization of Blind Source Separation Algorithms for Convolutive Mixtures Based on Second-Order Statistics", IEEE Transactions on Speech and Audio Processing, vol. 13, No. 1, Jan. 2005.*

(Continued)

*Primary Examiner* — Jialong He
(74) *Attorney, Agent, or Firm* — Espartaco Diaz Hidalgo

(57) ABSTRACT

The present invention relates to blind source separation. More specifically certain embodiments relate to the blind source separation using frequency domain processes. Aspects of the invention relate to methods and systems for receiving a set of frequency-domain first signals, and then separating the set of frequency-domain first signals into a set of frequency-domain second signals. The frequency-domain second signals may have a set of separated frequency-domain second signal elements corresponding to individual frequencies wherein each frequency-domain second signal element is assigned an identifier. The identifier may indicate which of the set of frequency-domain second signals includes the frequency-domain second signal element. Some aspects also include reordering the identifiers corresponding to at least one frequency to improve coherence of the frequency-domain second signals and to produce a set of frequency-domain third signals.

20 Claims, 24 Drawing Sheets

(56) References Cited

U.S. PATENT DOCUMENTS

| | | | |
|---|---|---|---|
| 5,208,786 A | 5/1993 | Weinstein et al. | |
| 5,251,263 A | 10/1993 | Andrea et al. | |
| 5,327,178 A | 7/1994 | McManigal | |
| 5,375,174 A | 12/1994 | Denenberg | |
| 5,383,164 A | 1/1995 | Sejnowski et al. | |
| 5,471,538 A | 11/1995 | Sasaki et al. | |
| 5,675,659 A | 10/1997 | Torkkola | |
| 5,706,402 A * | 1/1998 | Bell | 706/22 |
| 5,742,735 A * | 4/1998 | Eberlein et al. | 704/229 |
| 5,770,841 A | 6/1998 | Moed et al. | |
| 5,999,567 A | 12/1999 | Torkkola | |
| 5,999,956 A | 12/1999 | Deville | |
| 6,002,776 A | 12/1999 | Bhadkamkar et al. | |
| 6,061,456 A | 5/2000 | Andrea et al. | |
| 6,108,415 A | 8/2000 | Andrea | |
| 6,130,949 A | 10/2000 | Aoki et al. | |
| 6,167,417 A * | 12/2000 | Parra et al. | 708/405 |
| 6,381,570 B2 | 4/2002 | Li et al. | |
| 6,385,323 B1 | 5/2002 | Zoels | |
| 6,393,199 B1 | 5/2002 | Lemke et al. | |
| 6,424,960 B1 * | 7/2002 | Lee et al. | 706/20 |
| 6,462,664 B1 | 10/2002 | Cuijpers et al. | |
| 6,496,581 B1 | 12/2002 | Finn et al. | |
| 6,502,067 B1 | 12/2002 | Hegger et al. | |
| 6,526,148 B1 | 2/2003 | Jourjine et al. | |
| 6,549,630 B1 | 4/2003 | Bobisuthi | |
| 6,594,367 B1 | 7/2003 | Marash et al. | |
| 6,606,506 B1 | 8/2003 | Jones | |
| 6,654,719 B1 * | 11/2003 | Papadias | 704/233 |
| 7,027,607 B2 | 4/2006 | Pedersen et al. | |
| 7,065,220 B2 | 6/2006 | Warren et al. | |
| 7,076,069 B2 | 7/2006 | Roeck | |
| 7,099,821 B2 | 8/2006 | Visser et al. | |
| 7,113,604 B2 | 9/2006 | Thompson | |
| 7,123,727 B2 | 10/2006 | Elko et al. | |
| 7,155,019 B2 | 12/2006 | Hou | |
| 7,203,323 B2 | 4/2007 | Tashev | |
| 7,295,972 B2 | 11/2007 | Choi | |
| 7,424,119 B2 | 9/2008 | Reichel | |
| 7,471,798 B2 | 12/2008 | Warren | |
| 7,474,755 B2 | 1/2009 | Niederdrank | |
| 7,603,401 B2 | 10/2009 | Parra et al. | |
| 7,711,553 B2 * | 5/2010 | Nam | 704/201 |
| 7,738,574 B2 * | 6/2010 | Jang et al. | 375/260 |
| 7,941,315 B2 | 5/2011 | Matsuo | |
| 8,160,273 B2 | 4/2012 | Visser et al. | |
| 2001/0037195 A1 | 11/2001 | Acero et al. | |
| 2001/0038699 A1 | 11/2001 | Hou | |
| 2002/0110256 A1 | 8/2002 | Watson et al. | |
| 2002/0136328 A1 | 9/2002 | Shimizu | |
| 2002/0193130 A1 | 12/2002 | Yang et al. | |
| 2003/0052820 A1 * | 3/2003 | Ferreol | 342/441 |
| 2003/0055735 A1 | 3/2003 | Cameron et al. | |
| 2003/0179888 A1 | 9/2003 | Burnett et al. | |
| 2003/0204380 A1 * | 10/2003 | Dishman et al. | 702/189 |
| 2004/0039464 A1 | 2/2004 | Virolainen et al. | |
| 2004/0120540 A1 | 6/2004 | Mullenborn et al. | |
| 2004/0136543 A1 | 7/2004 | White et al. | |
| 2004/0161121 A1 | 8/2004 | Chol et al. | |
| 2004/0165735 A1 | 8/2004 | Opitz | |
| 2004/0204922 A1 * | 10/2004 | Beadle et al. | 702/189 |
| 2004/0230428 A1 * | 11/2004 | Choi | 704/226 |
| 2005/0060142 A1 * | 3/2005 | Visser et al. | 704/201 |
| 2005/0091042 A1 * | 4/2005 | Acero et al. | 704/205 |
| 2005/0175190 A1 | 8/2005 | Tashev et al. | |
| 2005/0195988 A1 | 9/2005 | Tashev et al. | |
| 2005/0203981 A1 * | 9/2005 | Sawada et al. | 708/322 |
| 2005/0249359 A1 | 11/2005 | Roeck | |
| 2005/0276423 A1 | 12/2005 | Aubauer et al. | |
| 2006/0032357 A1 | 2/2006 | Roovers et al. | |
| 2006/0053002 A1 * | 3/2006 | Visser et al. | 704/200 |
| 2006/0058983 A1 * | 3/2006 | Araki et al. | 702/190 |
| 2006/0071911 A1 | 4/2006 | Sullivan | |
| 2006/0083389 A1 | 4/2006 | Oxford et al. | |
| 2006/0148435 A1 | 7/2006 | Romesburg et al. | |
| 2006/0222184 A1 | 10/2006 | Buck et al. | |
| 2007/0021958 A1 | 1/2007 | Visser et al. | |
| 2007/0033020 A1 | 2/2007 | Francois et al. | |
| 2007/0053455 A1 | 3/2007 | Sugiyama | |
| 2007/0076900 A1 | 4/2007 | Kellermann et al. | |
| 2007/0088544 A1 | 4/2007 | Acero et al. | |
| 2007/0165879 A1 | 7/2007 | Deng et al. | |
| 2007/0244698 A1 | 10/2007 | Dugger et al. | |
| 2008/0175407 A1 | 7/2008 | Zhang et al. | |
| 2008/0201138 A1 | 8/2008 | Visser et al. | |
| 2008/0208538 A1 | 8/2008 | Visser et al. | |
| 2008/0260175 A1 | 10/2008 | Elko | |
| 2009/0164212 A1 | 6/2009 | Chan et al. | |
| 2009/0299739 A1 | 12/2009 | Chan et al. | |

FOREIGN PATENT DOCUMENTS

| | | |
|---|---|---|
| EP | 1006652 | 6/2000 |
| EP | 1796085 | 6/2007 |
| JP | H03269498 A | 12/1991 |
| JP | 4184400 A | 7/1992 |
| JP | 07131886 | 5/1995 |
| JP | H10124084 A | 5/1998 |
| JP | 2000305594 A | 11/2000 |
| JP | 2001022380 A | 1/2001 |
| JP | 2001177900 A | 6/2001 |
| JP | 2002540696 A | 11/2002 |
| JP | 2003526142 A | 9/2003 |
| JP | 2007295085 | 11/2007 |
| JP | 2008057926 A | 3/2008 |
| TW | 151853 | 2/1991 |
| TW | 591241 B | 6/2004 |
| TW | I268477 | 12/2006 |
| TW | I269235 B | 12/2006 |
| TW | 200743096 | 11/2007 |
| WO | 0077168 A2 | 12/2000 |
| WO | WO0127874 | 4/2001 |
| WO | 03062802 A2 | 7/2003 |
| WO | WO2004053839 | 6/2004 |
| WO | 2004071130 A1 | 8/2004 |
| WO | WO2005083706 | 9/2005 |
| WO | WO2006012578 | 2/2006 |
| WO | WO2006028587 | 3/2006 |
| WO | WO2006034499 | 3/2006 |
| WO | WO2007100330 | 9/2007 |

OTHER PUBLICATIONS

Choi et al. "Blind Source Separation and Independent Component Analysis: A Review", Neural Information Processing—Letters and Reviews, vol. 6, No. 1, Jan. 2005.*

Visser et al. "A comparison of simultaneous 3-channel blind source separation to selective separation on channel pairs using 2-channel BSS", ICLSP'04, vol. IV, 2004, pp. 2869-2872.*

Der, "Blind Signal Separation", Research Report, [Online], from Department of Electrical & Computer Engineering, McGill University, 2001.*

Ikeda et al. "A Method of Blind Separation on Temporal Structure of Signals", Proc. 5th Int. Conf. Neural Inf. Process, Kitakyushu, Japan, Oct. 1998.*

Sawada et al. "A Robust and Precise Method for Solving the Permutation Problem of Frequency-Domain Blind Source Separation", IEEE Transactions on Speech and Audio Processing, vol. 12, No. 5, Sep. 2004.*

Buchner et al. "Blind Source Separation for Convolutive Mixtures: A Unified Treatment", Audio Signal Processing, Kluwer Academic Publishers, Boston, Feb. 2004.*

Rahbar et al. "A Frequency Domain Method for Blind Source Separation of Convolutive Audio Mixtures", IEEE Transactions on Speech and Audio Processing, vol. 13, No. 5, Sep. 2005.*

Amari, S. et al. "A New Learning Algorithm for Blind Signal Separation." In: Advances in Neural Information Processing Systems 8 (pp. 757-763). Cambridge: MIT Press 1996.

Amari, S.et al. "Stability Analysis of Learning Algorithms for Blind Source Separation," Neural Networks Letter, 10(8):1345-1351. 1997.

(56) References Cited

OTHER PUBLICATIONS

Bell, A. et al.: "An Information-Maximization Approach to Blind Separation and Blind Deconvolution," Howard Hughes Medical Institute, Computational Neurobiology Laboratory, The Salk Institute, La Jolla, CA USA and Department of Biology, University of California, San Diego, La Jolla, CA USA., pp. 1129-1159, 1995.
Cardosa, J-F., "Fourth-Order Cumulant Structure Forcing. Application To Blind Array Processing." Proc. IEEE SP Workshop on SSAP-92, pp. 136-139. 1992.
Cohen, I. et al., "Real-Time TF-GSC in Nonstationary Noise Environments", Israel Institute of Technology, pp. 1-4, Sep. 2003.
Cohen. I. et al. "Speech Enhancement Based On A Microphone Array and Log-Spectral Amplitude Estimation", Israel Institute of Technology, pp. 1-3. 2002.
Comon, P.: "Independent Component Analysis, A New Concept?," Thomson-Sintra, Valbonne Cedex, France, Signal Processing 36 (1994) 287-314, (Aug. 24, 1992).
First Examination Report dated Oct. 23, 2006 from Indian Application No. 1571/CHENP/2005.
Griffiths, L. et al. "An Alternative Approach To Linearly Constrained Adaptive Beamforming." IEEE Transactions on Antennas and Propagation, vol. AP-30(1):27-34. Jan. 1982.
Herault, J. et al., "Space or time adaptive signal processing by neural network models" Neural Networks for Computing, In J. S. Denker (Ed.). Proc. Of the AIP Conference (pp. 206-211) New York: American Institute of Physics. 1986.
Hoshuyama, O. et al., "A robust adaptive beamformer for microphone arrays with a blocking matrix using constrained adaptive filters." IEEE Transcations on Signal Processing, 47(10):2677-2684. 1999.
Hoshuyama, O.et al., "Robust Adaptive Beamformer with a Blocking Matrix Using Coefficient-Constrained Adaptive Filters", IEICE Trans, Fundamentals, vol. E-82-A, No. 4, Apr. 1999, pp. 640-647.
Hua, T.P. et al., "A new self calibration-technique for adaptive microphne arrays," International workshop on Acoustic Echo and Noise Control Eindhoven, pp. 237-240, 2009.
Hyvarinen, A. et al. "A fast fixed-point algorithm for independent component analysis" Neural Computation, 9:1483-1492. 1997.
Hyvarinen, A. "Fast and robust fixed-point algorithms for independent component analysis." IEEE Trans. On Neural Networks, 10(3):626-634. 1999.
International Search Report and Written Opinion—PCT/US2007/004966, International Search Authority—European Patent Office—Jan. 24, 2008.
Jutten, C. et al.: "Blind Separation of Sources, Part I: An Adaptive Algorithm based on Neuromimetic Architecture," Elsevier Science Publishers B.V., Signal Processing 24 (1991) 1-10.
Lambert, R. H. "Multichannel blind deconvolution: FIR matrix algebra and seperation of multipath mixtures." Doctoral Dissertation, University of Southern California. May 1996.
Lee, Te-Won et al., "A contextual blind separation of delayed and convolved sources" Proceedings of the 1997 IEEE International Conference on Acoutsics, Speech, and Signal Processing (ICASSP' 97), 2:1199-1202. 1997.
Lee, Te-Won et. al. "A Unifying Information-Theoretic Framework for Independent Component Analysis" Computers and Mathematics with Applications 39 (2000) pp. 1-21.
Lee, Te-Won et. al.: "Combining Time-Delayed Decorrelation and ICA: Towards Solving The Cocktail Party Problem," p. 1249-1252, (1998).
Lee. T.-W. et al. "Independent Component Analysis for Mixed Sub-Gaussian and Super-Gaussian Sources." 4th Joint Symposium Neural Computation Proceedings, 1997, pp. 132-139.
Molgedey, L. et al., "Separation of a mixture of independent signals using time delayed correlations," Physical Review Letters, The American Physical Society, 72(23):3634-3637. 1994.
Mukai, R. et al., "Blind Source Separation and DOA Estimation Using Small 3-D Microphone Array," in Proc. of HSCMA 2005, pp. d-9-d-10, Piscataway, Mar. 2005.
Mukai, R., et al. "Frequency Domain Blind Source Separation of Many Speech Signals Using Near-field and Far-field Models," EURASIP Journal on Applied Signal Processing, vol. 2006, Article ID 83683, 13 pages, 2006. doi:10.1155/ASP/2006/83683.
Murata, N. et. al.:"An On-line Algorithm for Blind Source Separation on Speech Signals." Proc. Of 1998 International Symposium on Nonlinear Theory and its Application (NOLTA98), pp. 923-926, LeRegent, Crans-Montana, Switzerland 1998.
Office Action dated Mar. 23, 2007 from co-pending U.S. Appl. No. 11/463,376, filed Aug. 9, 2006.
Office Action dated Jul. 23, 2007 from co-pending U.S. Appl. No. 11/187,504, filed Jul. 22, 2005.
Parra, L. et al.. "An adaptive beamforming perspective on convolutive blind source separation" Chapter IV in Noise Reduction in Speech Applications, Ed. G. Davis, CRC Press: Princeton, NJ (2002).
Parra, L. et. al.: "Convolutive Blind Separation of Non-Stationary Sources," IEEE Transactions on Speech and Audio Processing, vol. 8(3), May 2000, p. 320-327.
Platt, et al., "Networks for the separation of sources that are superimposed and delayed." In J. Moody, S. Hanson, R. Lippmann (Eds.), Advances in Neural Information Processing 4 (pp. 730-737). San Francisco: Morgan-Kaufmann. 1992.
Serviere, Ch. et al. "Permutation Correction in the Frequency Domain in Blind Separation of Speech Mixtures." EURASIP Journal on Applied Signal Processing, vol. 2006. article ID 75206, pp. 1-16, DOI: 10.1155/ASP/75206.
Taesu, K. et al: "Independent Vector Analysis: An Extension of ICA to Multivariate Components" Independent Component Analysis and Blind Signal Separation Lecture Notes in Computer Sciene; LNCS 3889, Springer-Verlag Berlin Heidelberg, Jan. 1, 2006, pp. 165-172, XP019028810.
Taesu Kim et al., 'Independent Vector Analysis: Definition and Algorithms,' ACSSC'06, pp. 1393-1396, Oct. 2006.
Tong, L. et al., "A Necessary and Sufficient Condition For The Blind Identification Of Memoryless Systems." Circuits and Systems, IEEE International Symposium, 1:1-4. 1991.
Torkkola K., "Blind separation of convolved sources based on information maximization," IEEE workshop on Neural Networks for Signal Processing, Kyoto, Japan, Sep. 1996, pp. 423-432.
Torkkola, Kari. "Blind deconvolution, information maximization and recursive filters." IEEE International Conference on Acoustics, Speech, and Signal Processing (ICASSP'97), 4:3301-3304. 1997.
Van Compernolle, D. et al., "Signal Separation In A Symmetric Adaptive Noise Canceler By Output Decorrelation." Acoustics, Speech and Signal Processing, 1992, ICASSP-92., 1992 IEEE International Conference, 4:221-224.
Visser, E. et al. "A Spatio-temporal speech enhancement for robust speech recognition in noisy environments." University of California, San Diego. Institute for Neural Computation. White Paper. pp. 1-4, doi:10.1016/S0167-6393(03)00010-4 (Oct. 2003).
Visser, E. et al. "Speech enhancement using blind source separation and two-channel energy based speaker detection" Acoustics, Speech, and Signal Processing, 2003. Proceedings ICASSP'03 2003 IEEE International Conference on, vol. 1, Apr. 6-10, 2003, pp. I.
Visser, E. et. al.: "Blind Source Separation In Mobile Environments Using A Priori Knowledge" Acoustics, Speech, and Signal Processing, 2004 Proceedings. (ICASSP '04).
Yellin, D. et al. "Multichannel signal separation: Methods and analysis." IEEE Transactions on Signal Processing. 44(1):106-118, Jan. 1996.
Yermeche, Z. et al. A Constrained Subband Beamforming Algorithm for Speech Enhancement. Blekinge Institute of Technology. Department of Signal Processing, Dissertaion ( 2004). pp. 1-135.
Yermeche. Zohra. "Subband Beamforming for Speech Enhancement in Hands-Free Communication." Blekinge Institute of Technology, Department of Signal Processing, Research Report (Dec. 2004). pp. 1-74.
Supplementary European Search Report—EP07751705—Search Authority—Munich—Mar. 16, 2011.
Tatsuma, Junji et al., "A Study on Replacement Problem in Blind Signal Separation." Collection of Research Papers Reported in the General Meeting of the Institute of Electronics, Information and Communication Engineers, Japan, The Institute of Electronics, Information and Communication Engineers (IEICE), Mar. 8, 2004.

* cited by examiner

SYSTEM AND METHOD FOR GENERATING A SEPARATED SIGNAL BY REORDERING FREQUENCY COMPONENTS

CROSS-REFERENCE TO RELATED APPLICATIONS

The present application claims priority from U.S. Provisional Patent Application No. 60/777,900, filed on Mar. 1, 2006, and also from U.S. Provisional Patent Application No. 60/777,920, filed on Mar. 1, 2006, both of which are incorporated herein by reference in their entireties.

BACKGROUND OF THE INVENTION

1. Field of the Invention

The present invention relates to blind source separation. More specifically it relates to blind source separation of signals using frequency domain processes.

2. Description of the Related Art

Acoustic mixtures can be separated using blind source separation (BSS) methods, which may comprise either time- or frequency-domain methods. Time-domain methods may achieve better separation performance but may result with more computations than comparable frequency-domain methods. Also, since in time-domain methods, every filter tap adaptation depends on all other taps, convergence may be slow, prone to local minima and may therefore heavily depend on good initialization.

Therefore, there is a need for devices and methods that can result in improved signal separation while reducing computation time and/or improving solution convergence.

SUMMARY OF THE INVENTION

In some embodiments, the present invention relates to a signal separation method including receiving a set of frequency-domain first signals, wherein each frequency-domain first signals comprises frequency-domain first signal elements corresponding to a plurality of frequencies, and wherein the set of frequency-domain first signals comprises a plurality of signal sources; separating the set of frequency-domain first signals into a set of frequency-domain second signals, wherein the set of frequency-domain second signals comprises a set of separated frequency-domain second signal elements corresponding to individual frequencies of the plurality of frequencies, and wherein each frequency-domain second signal element is assigned an identifier which indicates which of the set of frequency-domain second signals includes the frequency-domain second signal element, and reordering the identifiers corresponding to at least one frequency to improve the coherence of the frequency-domain second signals to produce a set of frequency-domain third signals.

The separating the set of frequency-domain first signals may include a blind-source separation method. The blind-source separation method may be applied to the frequency-domain first signal elements corresponding to individual frequencies. The coherence may include a function that reflects the co-activity of signals at different frequencies. Improving the coherence of the frequency-domain second signals may include optimizing the coherence of the frequency-domain second signals. Improving the coherence of the frequency-domain second signals may include improving the coherence of a pair of adjacent frequency-domain second signal elements. Reordering the identifiers may include reordering the identifiers corresponding to a plurality of frequencies. Reordering the identifiers may further include sequentially reordering the identifiers from a low frequency of the plurality of frequencies to a high frequency of the plurality of frequencies. Reordering the identifiers may include reordering the identifiers corresponding to a plurality of frequencies. Reordering the identifiers may further include improving the coherence between non-overlapping pairs of frequency-domain second signal elements. Improving the coherence of the frequency-domain second signals may include optimizing the coherence of frequency-domain second signal elements corresponding to a first subset of frequencies; and optimizing the coherence of frequency-domain second signal elements corresponding to a second subset of frequencies, wherein the second subset of frequencies is larger than the first subset of frequencies, and wherein the second subset of frequencies comprises the first subset of frequencies. In some embodiments, a method disclosed herein may further include transforming a set of time-domain input signals to produce the set of frequency-domain first signals. The time-domain input signals may be acoustic signal mixtures. The acoustic signal mixture may include a speech signal. In some embodiments, a method disclosed herein may further include inverse transforming a frequency-domain third signal of the set of frequency-domain third signals to produce a desired signal.

In some embodiments, the present invention relates to a signal separation method including receiving a set of frequency-domain first signals, wherein each frequency-domain first signals comprises frequency-domain first signal elements corresponding to a plurality of frequencies, and wherein the set of frequency-domain first signals comprises a plurality of signal sources; separating the set of frequency-domain first signals into a set of frequency-domain second signals using an Independent Vector Analysis (IVA) method comprising a learning rule; and applying one or more constraints to the learning rule.

The one or more constraints may be derived from the set of frequency-domain second signals. Applying one or more constraints to the learning rule may reduce the probability of converging upon a local minimum or maximum. A method disclosed herein may further include receiving a second set of frequency-domain first signals and separating the second set of frequency-domain first signals using the constrained signal separation method. The one or more constraints may include geometric constrains. The geometric constraints may include estimated direction of arrival information and wherein the direction of arrival information is estimated by computing output signal subbands from histograms and/or other statistical techniques using known sensor locations. The one or more constraints may include information regarding spectral or energy characteristics of a signal. The signal may be selected from frequency-domain first signal, a desired output signal, and an undesired output signal. The one or more constraints may include non-derived constraints.

In some embodiments, the present invention relates to a system for separating signals, comprising a receiver that receives a set of time-domain input signals; a transformer module that transforms the set of time-domain input signals to a set of frequency-domain first signals, wherein each frequency-domain first signals comprises frequency-domain first signal elements corresponding to a plurality of frequencies, and wherein the set of frequency-domain first signals comprises a plurality of signal sources; a frequency-domain signal separator module that separates the set of frequency-domain first signals into a set of frequency-domain second signals, wherein the set of frequency-domain second signals comprises a set of separated frequency-domain second signal elements corresponding to individual frequencies of the plurality of frequencies, and wherein each frequency-domain second signal element is assigned an identifier which indicates which of the set of frequency-domain second signals includes the frequency-domain second signal element, and a reordering module that reorders the identifiers corresponding to at least one frequency to improve the coherence of the frequency-domain second signals to produce a set of frequency-domain third signals.

The frequency-domain signal separator module may separate the set of frequency-domain first signals by using an Independent Component Analysis method and/or an Independent Vector Analysis method. The reordering module may include an initial parameter sub-module that determines the first frequency-domain second signal elements to be reordered by determining the corresponding frequency; a coherence improving sub-module that improves the coherence of frequency-domain second signal elements corresponding to a pre-determined frequency with frequency-domain second signal elements corresponding to a frequency adjacent to the pre-determined frequency; and a frequency-advance sub-module that determines subsequent frequency-domain second signal elements to be reordered, wherein the frequency-advance sub-module determines subsequent frequency-domain second signal elements as those corresponding to a frequency adjacent to a frequency corresponding to the most-recently reordered frequency-domain second signal elements.

The reordering module may include an initial parameter sub-module that determines the first frequency-domain second signal elements to be reordered by determining the corresponding frequency; a coherence improving sub-module that improves the coherence of frequency-domain second signal elements corresponding to a pre-determined frequency with frequency-domain second signal elements corresponding to a frequency adjacent to the pre-determined frequency; and a frequency-advance sub-module that determines subsequent frequency-domain second signal elements to be reordered, wherein the frequency-advance sub-module determines subsequent frequency-domain second signal elements as those not previously analyzed by the coherence improving sub-module. The reordering module may include an initial parameter sub-module that determines the initial state of a group of reordering elements as first frequency-domain second signal elements corresponding to at least one frequency; a coherence improving sub-module that improves the coherence of frequency-domain second signal elements within the group of reordering elements; and a frequency-advance sub-module that determines frequency-domain second signal elements to be added to the group of reordering elements. A system described herein may include an inverse transformer module that inversely transforms a frequency-domain third signal of the set of frequency-domain third signals to produce a desired signal. The system may include a headset and/or a telephone.

In some embodiments, the present invention relates to a system for separating signal including a receiver that receives a set of time-domain input signals; a transformer module that transforms the set of time-domain input signals to a set of frequency-domain first signals, wherein each frequency-domain first signals comprises frequency-domain first signal elements corresponding to a plurality of frequencies, and wherein the set of frequency-domain first signals comprises a plurality of signal sources; a frequency-domain signal separator module that separates the set of frequency-domain first signals into a set of frequency-domain second signals using an Independent Vector Analysis (IVA) method comprising a learning rule; and a constraint imposer module that imposes one or more constraints on the learning rule.

A system described herein may further include a constraint deriver module that derives the one or more constraints from the set of frequency-domain second signals. The one or more constraints may include geometric constrains. The geometric constraints may include estimated direction of arrival information. The direction of arrival information may be estimated by computing output signal subbands from histograms and/or other statistical techniques using known sensor locations. The one or more constraints may include non-derived constraints. The one or more constraints may include information regarding spectral or energy characteristics of a signal in the frequency-domain signal separator module. A system described herein may include a headset and/or a telephone.

DETAILED DESCRIPTION OF THE PREFERRED EMBODIMENT

Figure 1:
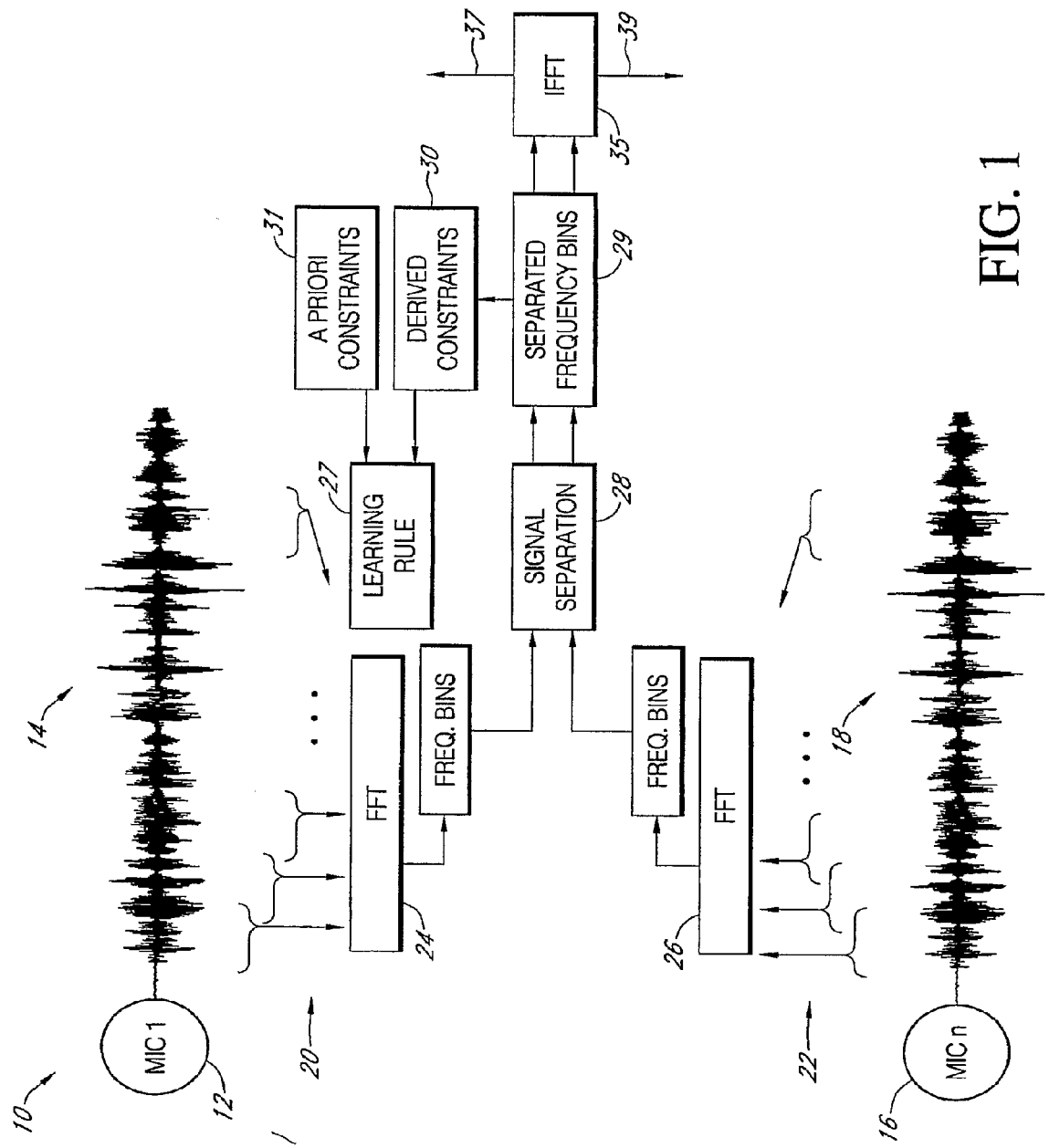
FIG. 1 is an illustration of one embodiment of a signal separation system that includes a priori constraints.

Independent vector analysis (IVA) has been used in signal separation methods and systems. IVA methods may be implemented in the frequency domain, such that time-domain signal mixtures are first transformed into the frequency domain. Signal separation methods may then be applied to each frequency component of the signal mixtures in order to separate output signal mixtures. Learning rules associated with IVA may maintain that separated output signal elements associated with any given frequency be independent, while correlations may exist across frequencies. IVA methods may therefore comprise fully adaptive filters. However, such methods may be prone to converging upon local minimum and maximum. Further, while the learning rules may provide for sub-bands within an output signal, they may be insufficient for properly identifying all of the signal elements to the correct source.

In some embodiments, the present invention relates to improving methods and systems comprising independent vector analysis (IVA) steps and/or modules. In some embodiments, methods and systems disclosed herein improve the performance by, for example, reducing the probability of converging upon a local minimum or maximum and/or improving the speed and/or robustness.

In some embodiments, the present invention relates to methods and/or systems comprising constraints applied to a signal separation process. The constraints may be applied to a learning rule of the signal separation process. The learning rule may be modified at regular time intervals. The constraints may be known a priori or derived and may include geometric constraints. The constraints may reduce the probability that the signal separation process converges to a local minimum or maximum.

In some embodiments, the present invention relates to reassigning the separated source elements corresponding to different frequencies to different output sources, in order to improve the coherence among the source elements of different frequencies assigned to each source. Such reassigning may comprise linear, bottom-up, or top-down techniques in order to identify, for example, the optimal reassignments.

Input Signals

In some embodiments, the present invention relates to methods or systems for separating signals. The signals may be two or more signals. The signals may be acoustic signals. Alternatively, the signals may be biomedical, spectral, data, or other data source signals.

The signals may be generated from one, two, or more microphones. The microphones may be mounted on a speech accessory or a speech device, such as a headset or wireless mobile handset. The microphones may be positioned to receive acoustic signals from multiple sound sources, which may include a target source such as a human speaker. A microphone may use transducer technology convert the acoustic signal into an electric signal.

A method or system described herein may function to separate a speech signal from, for example, background noise. It will be appreciated that the disclosed system may be advantageously used on a wide range of acoustic products.

Frequency-Domain Signal Separation Comprising Constraints

In some embodiments, the present invention relates to methods and/or systems comprising signal separation performed in the frequency domain and imposing constraints on the signal separation. The constraints may be derived from separated data previously produced by the signal separation. The constraints may be known a priori based on prior separation experience. In one embodiment, the constraints may comprise geometric constraints, or constraints related to spectral properties of the sources. In addition, the constraints may be applied through a learning rule. While in some embodiments, systems and devices may comprise transforming time-domain signals into spectral input signals, in other embodiments, the transforming process is not a part of the systems and devices.

In some embodiments, systems and devices include inverse transforming at least one separated frequency-domain signal into at least one time-domain signal, though in other embodiments, they do not. In some embodiments, signal separation comprises blind-source separation. In some embodiments, signal separation comprises Independent Vector Analysis (IVA) or Independent Component Analysis (ICA).

Referring to FIG. 1, a system 10, provides one process and system for separating signals. Multiple microphones, such as microphone 12 and microphone 16, receive signals. Though only two microphones are shown, it will be appreciated that a different number of microphones may be included in additional embodiments. Microphones 12 and 16 may function to convert acoustic signals (not shown) into electric signals 14 and 18, respectively.

The electric signals 14 and 18 are, in some embodiments, time-domain signals. The electric signals 14 and 18 may be sampled into sampling window sets 20 and 22 respectively. Each sampling window of sampling window sets 20 and 22 may be, for example, acquired at about 8 kHz and extend for about 200 time sampling units. It will be appreciated that other sampling window lengths and sampling rates may be used, which may depend on the specific application and type of time domain signal.

A fast Fourier transform (FFT) may then be performed on each sampling window of sampling window sets 20 and 22 by FFT processes 24 and 26, respectively. In this way, each FFT process 24 and 26 generates frequency domain information which is used as inputs to a signal separation process 28.

The signal separation process 28 may advantageously be a blind signal separation process, such as an ICA (independent component analysis) process, or another separation process. The signal separation process 28 may attempt to separate the output frequency domain data into independent signal sources. The independent signal sources may include two signal sources, as shown in FIG. 1, or more signal sources. More particularly, the output data is placed in to frequency bins and stored temporarily in a separated frequency bin data 29. It will be appreciated that other sub-band transforms like wavelet filterbanks yielding some kind of frequency dependent sub-band structure can be used.

The separated frequency bin data 29 may be input to an inverse fast Fourier transformer (IFFT) process 35. Each separated component of the separated frequency bin data 29 may then be transformed by the IFFT process 35 to correspond to a time-domain output, such as time-domain outputs 37 and 39. In some instances, there will be more than two time-domain outputs. One of the time domain outputs may be an estimate of the source signal and one or more of the outputs may be an estimate of one or more noise signals. In some instances, not all of the separated components of the separated frequency bin data 29 are transformed by the IFFT process 35. For example, only the separated component corresponding to the source signal may be transformed by the IFFT process 35.

The signal separation process 28 may use a learning rule 27 to separate the frequency domain inputs into separated source assignments. Advantageously, the learning rule 27 may be constrained for improved separation performance by adding an additional term to the filter learning rule. By constraining the learning rule 27, a more efficient and robust separation process may be enabled. The learning rule 27 may be constrained by a priori constraints 31. These a priori constraints 31 may relate to, for example, the expected source position or range of positions, expected separated signal spectral characteristics, or another expected signal quality. In a specific example, if a source is known to be in a particular location, the learning rule 27 may be a priori constrained to find that source in a limited position range. In this way, the source may be more quickly and accurately identified. It will be appreciated that other a priori constraints 31 may be used to make the learning rule more efficient. For example, the a priori constraints 31 may relate to, for example, the expected position or spectral characteristics of a noise signal. The a priori constraints may include a signal spectrum constraint specified by the user. For example, in some applications such as radar and sonar, good estimations of stimulation signals are usually available.

The learning rule 27 may also be constrained by derived constraints 30. These derived constraints 30 use the separated frequency bin data 29 to adjust or set target properties of the separated signals in the learning rule 27. For example, if the separated frequency bin data 29 indicates that a source is in a particular location range, then a derived constraint 30 may be set to limits the "view" of the learning rule 27 to that location, or at least to the general area around the derived location. This location information may include, for example, direction of arrival (DOA) information. The derived constraints 30 may also be able to adapt the default a priori constraints 31 according to actual operating conditions. It should be noted that the derived constraints 30 are obtained and adapted while converging to a partially separated solution in an "on the fly" fashion, as opposed to a priori constraints 31 which are available before the filter learning process starts. In some embodiments, both derived constraints 30 and a priori constraints 31 are applied to the learning rule 27. In other embodiments, only derived constraints 30 are applied to the learning rule 27. In still other embodiments, only a priori constraints 31 are applied to the learning rule 27. Additionally, the a priori constraints 31 may be configured to influence the derived constraints 30, and/or the derived constraints 30 may be configured to influence the a priori constraints 31. For example, the a priori constraints 31 may affect the initial conditions of the derived constraints 30.

Figure 2:
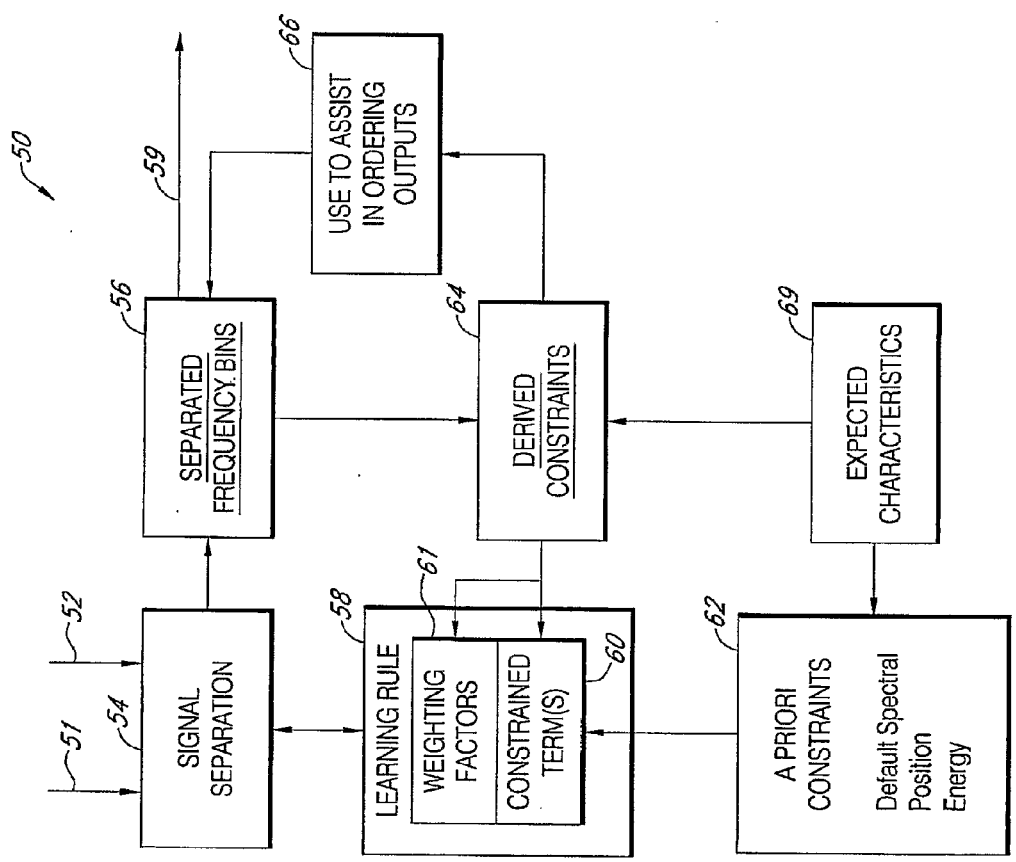
FIG. 2 is an illustration of one embodiment of a signal separation system that includes modules for applying a priori constraints to a learning rule.

In some embodiments, the present invention relates to a separation system 50, as illustrated in FIG. 2. A signal separation module 54 may receive input signals from one or more input channels, corresponding to input channels 51 and 52 in FIG. 2. The signal separation module 54 may be a blind signal separation process, which may comprise an independent component analysis (ICA) process, though other processes may be used.

The signal separation module 54 may influence and may be influenced by a learning rule 58. The learning rule 58 may include one or more constrained terms 60 for constraining the operation of the learning rule 58. These one or more constrained terms 60 may include a directivity matrix, or may include null beam and geometric information. The constrained terms 60 may have default settings, or may include a priori constraints 62. A priori constraints 62 may include information regarding, for example, source position, source energy, or spectral information of the source, obtained by, for example, another aspect of a device or system. The constrained terms 60 may also include derived constraints 64, as described further below.

The learning rule 58 may also comprise weighting factors 61, which may multiply the one or more constrained terms 60 and may be used to trade off the BSS optimization objective against enforcement of a priori constraints 62 and derived constraints 64. The weighting factors 61 for the one or more constrained terms 60 with respect to the BSS objective may be preset too or adjusted for more reliable, faster and more optimal separation. It will be appreciated that the weighting factors may be adapted according to operational conditions. It will also be appreciated that some constraints may be fixed and unadaptable, while others are default starting points that are intended for adaptation. The weighting factors may be adapted by derived constraints 64, as described further below.

During operation, the signal separation module 54 may generate separated frequency bin output data 56 that is organized in frequency bins according to an assigned signal source. A separated component of the separated frequency bin output data 56 may include a separated frequency binned source component 59. In one embodiment, the separated frequency binned source component 59 may be output to an IFFT process where a separated time domain source signal is generated. In another embodiment, only the frequency domain separating weights are sent through the IFFT and the time domain mixture signals are filtered with the obtained time domain separating filters.

The separated frequency bin output data 56 may also be used to determine one or more derived constraints 64. These derived constrains 64 are typically geometric or position information, but may also include spectral or energy information. The derived constraints 64 may also be dynamically adjusted according to expected characteristics 69 or information from another part of the overall system. For example, a wireless handset may have a radio that may provide information useful to further adjust or set derived constraints 64. The derived constraints 64 are used implicitly to assist in properly ordering 66 the separated frequency bin output data 56 through the constrained weighting factors 61 in the learning rule 58.

For example, phase relationships may be used for determining direction of arrival (DOA) information, and in the process of determining these phase relationships, information may be generated indicating that some output data is more appropriately associated with a different source. As a specific example, a sharp phase difference may be seen between adjacent frequency bins, which would generally be unexpected for speech signals. In this case, the phase discontinuity may indicate that some frequency range in the output data has been misassigned, and therefore the outputs for that frequency bin range should be rearranged by using the weighted constrained learning terms, for example, to minimize bin-to-bin phase change. The selection of the emerging DOA in a particular BSS output can be determined by some supervised method i.e. evaluating partially resolved separations in a graph as a function of BSS output DOAs, or in an unsupervised manner. For example, a Kalman filter may estimate the mean DOA in a particular BSS output by using phase information starting from the low frequencies toward the high frequencies and the typical variance of inter bin DOA fluctuations. As soon as DOA phase shifts exceed the typical inter bin variance by a statistically significant and unlikely amount, the frequency bin in which this strong DOA shift occurs likely marks a permutation event of frequency bin ranges between separated sources. The DOA estimate so far provided by the Kalman filter starting from the low frequency bins may be used as a derived DOA constraint parameter to force the remaining high frequency DOA for this BSS output to be aligned with the low frequency separated part of the BSS output.

Figure 3:
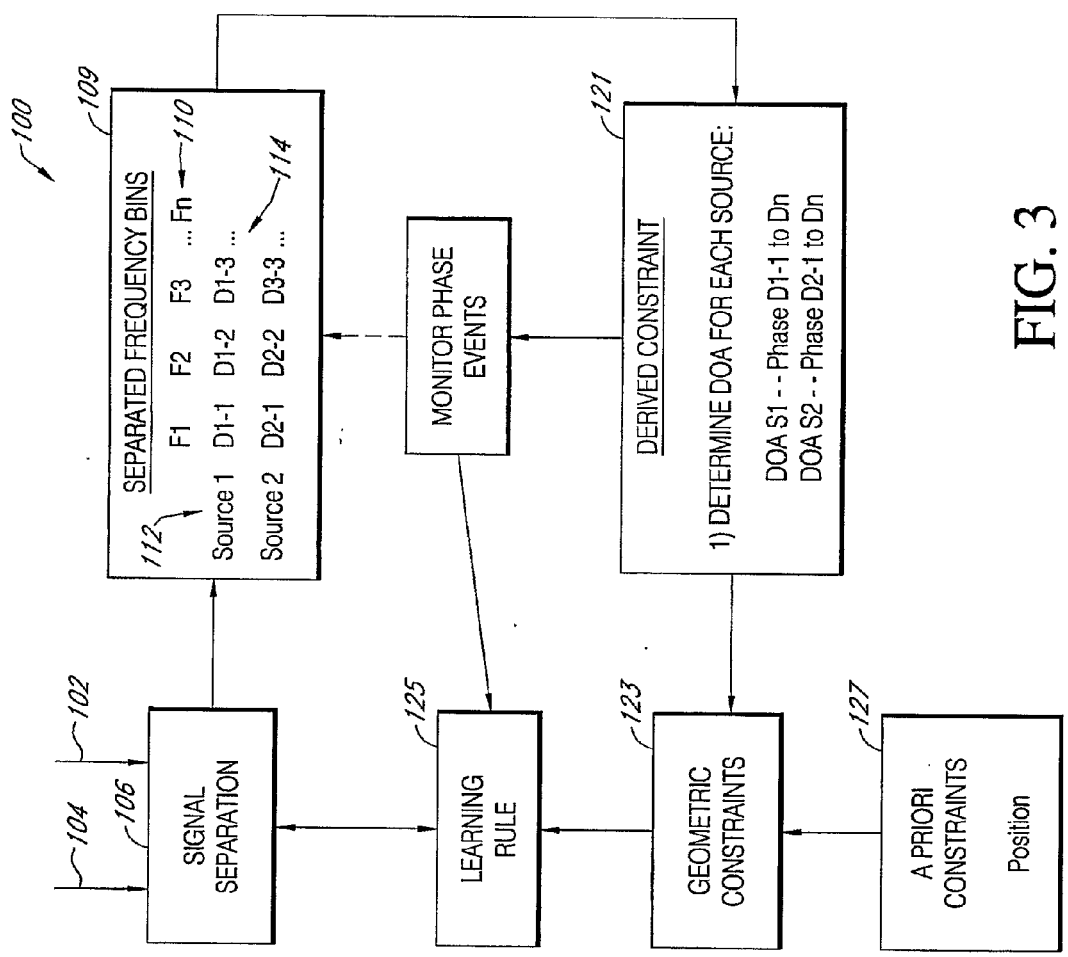
FIG. 3 is an illustration of one embodiment of a signal separation system.

In some embodiments, the present invention relates to a separation system 100, as illustrated in FIG. 3. The system 100 includes a signal separation module 106 that receives frequency data from one or more input channels, such as input channels 102 and 104, and generates generate separated frequency bin output data 109. The generate separated frequency bin output data 109 associates a set of frequency bins 110 with particular independent signal sources 112. Each frequency bin has output data 114, which represents complex frequency data for associated sample windows. The output data 114 may be used by a derivation process to derive derived constraints 121, such as direction of arrival (DOA) information for one or more sources. For example, the DOA for source 1 may be determined by an analysis of output data D1-1, D1-2, D1-3 to D1-n. The derivation process may average DOA information over a set of output data to more accurately locate the source, and may monitor for unusually large changes in phase information between frequency bins, which may indicate that some output data has been misassigned. It will be appreciated that other filter and selection processes may be used to determine DOA information.

The monitored phase events may also be used to rearrange output data in the separated frequency bin output data 109. For example, a sharp phase difference may be seen between adjacent frequency bins, which would generally be unexpected for speech signals. In this case, the phase discontinuity may indicate that some output data has been misassigned, and therefore the outputs for that frequency bin should be rearranged, for example, to minimize bin-to-bin phase change. It will be appreciated that other information may be derived that may be useful to assist in rearranging output data. As illustrated, the monitored phase events may be used to adjust the learning rule to adjust the signal separation process to correct the misassignment. In an alternative, the monitored phase events may be used by a re-ordering process to reorder BSS output data within one or more frequency bins.

The derived constraints 121 may be used to define geometric constraints 123 that may enable the learning rule 125 to more efficiently and robustly separate signals. For example, derived DOA information for one or more sources may be used to focus the learning rule to a particular geometric or positional solution. The geometric constraints 123 may also include default conditions or other a priori constraints 127. These a priori constraints 127 may be static, for example, if a microphone has a fixed relationship with a target source, or may be dynamically adjusted by other aspects of the device.

Figure 4:
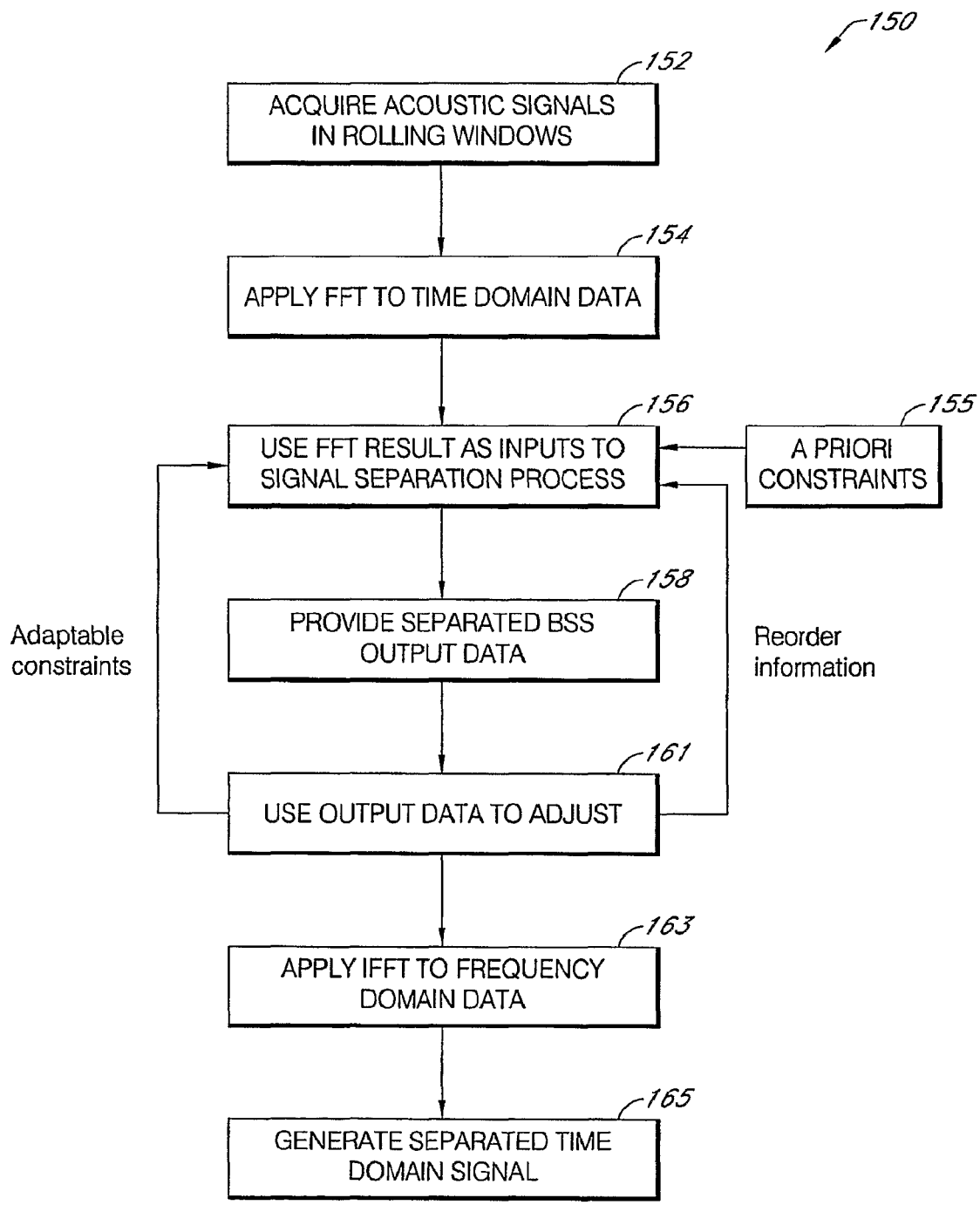
FIG. 4 is a flowchart of one embodiment of a signal separation process.

In some embodiments, the present invention relates to a separation process 150, as illustrated in FIG. 4. At step 152 of the process 150, acoustic signals are acquired in rolling windows. At step 154 of the process 150, a fast Fourier transform (FFT) is applied to the time domain rolling windows to create frequency domain data. At step 156 of the process 150, the resulting frequency domain data, otherwise referred to as FFT data, is used as channel inputs to a signal separation process. A priori constraints 155 may be used to make the signal separation process more efficient and robust. These a priori constraints 155 may be static or adjusted by another aspect of the overall system. At step 158 of the process 150, the output from the signal separation process provides separated BSS output data, separated according to signal source. At step 161 of the process 150, the separated output data may be analyzed to adjust steps of the process. For example, the separated output data may be used to adjust adaptable constraints or weighting factors in the learning rule for the separation process. The output data may also be analyzed to provide information useful to reorder or correct source assignments for the output data in the frequency bins. At step 163 of the process 150, the frequency domain data may be processed by an IFFT. At step 165 of the process 150, the IFFT may then generate a separated time domain signal. Alternatively, only the frequency domain separating weights may be sent through the IFFT and the time domain mixture signals may be filtered with the obtained time domain separating filters.

Multi-Variate Activation Functions and Geometric Constraints

In some embodiments, constraints of the methods and/or systems described herein include geometric constraints, and the constraints may be imposed on learning rules associated with IVA methods. Any processes or methods may be used to derive the constraints and apply the constraints to the signal separation processes or methods. However, one specific mathematical formulation follows as an example.

In the frequency domain, complex ICA is concerned with finding an unmixing matrix $W(\omega)$ for each frequency $\omega$ such that the demixed outputs $Y(\omega,l)=W(\omega)X(\omega,l)$, where $X(\omega,l)=[X_1(\omega,l),\ldots,X_M(\omega,l)]^T$ (time window l, number of mixtures M) is the DFT of time domain mixtures x(t), are mutually independent. The update rule for $W(\omega)$ is given by $$\Delta W(\omega)=\mu[I-\langle\phi(Y(\omega,l)Y(\omega,l)^H\rangle]W(\omega) \qquad \text{Eq. 1,}$$

where $Y(\omega,l)=[Y_1(\omega,l),\ldots,Y_M(\omega,l)]^T$, $\diamond$ denotes the averaging operator in time $l=1,\ldots,L$ and $\mu$ is the learning rate. The traditional Infomax activation function is given by $\phi(Y_j(\omega,l))=\tanh(|Y_j(\omega,l)|)*Y_j(\omega,l)/|Y_j(\omega,l)|$ which along with update rule (1), implies that the ICA problem is solved for each frequency bin independently, leading to the permutation problem. However, by assuming signals of interest have a certain dependency in the frequency domain that can be modeled by a multi-dimensional prior, the original dependent sources can be extracted as a group using such a prior. As a result, a multi-variate activation function $$\phi(Y_j(\omega,l))=Y_j(\omega,l)/(\Sigma_\omega|Y_j(\omega,l)|^2)^{0.5} \qquad \text{Eq. 2,}$$

is obtained where the term in the denominator relates to the separated source spectra power over all frequencies. It is noted the multi-variate activation function used here is a special case of a more general learning rule derived from general statistical distributions. See Kim, T., Lee, T.-W., "Systems and Methods for Blind Source Signal Separation", US patent application, Mar. 1, 2006 and Kim, T., Eltoft, T., Lee, T.-W., Independent Vector Analysis (IVA): An Extension of ICA to Multivariate Components, Proc. of 6$^{th}$ Conf. on ICA and BSS, pp. 165-172, March 2006, both of which are incorporated by reference in their entireties.) Scaling ambiguity of W is resolved by a scaling matrix designed with the minimum distortion principle.

The use of a multi-variate activation function as in equation (2) avoids the permutation problem by introducing an explicit dependency between individual frequency bin filter weights during the filter learning process. Practically, this simultaneous connected adaptation of filter weights introduces increased convergence dependency on initial filter conditions similar to what has been observed in time domain algorithms. Therefore geometric constraints are used here to overcome these practical limitations.

Any geometric constraints may be applied to methods and/or systems herein. Further, a priori constraints or derived constraints described herein may include only geometric constraints, include geometric constraints along with other constraints, or may not include any geometric constraints.

Geometric constraints can be used to constrain the spatial response of a particular output channel to a particular orientation and placing null beams in others. This is a common concept underlying linearly constrained adaptive beamforming, in particular generalized sidelobe canceller (GSC). The idea put forward here is to add a regularization term to the independent vector analysis (IVA, see Kim et al., "Systems and Methods for Blind Source Signal Separation", US patent application, Mar. 1, 2006) cost function that supports its objective of focusing on a particular source direction by placing spatial nulls in interfering source directions. The following regularization term is proposed $$J(\omega)=\alpha(\omega)\|W(\omega)^*D(\omega,\theta_{est})-C(\omega)\|^2 \quad \text{Eq. 3,}$$

where the M×M matrix $C(\omega)$ is given by $$C(\omega) = \begin{matrix} c_1(\omega) & 0 & 0 & \ldots \\ 0 & c_2(\omega) & 0 & \ldots \\ 0 & 0 & \ldots & \ldots \\ \ldots & \ldots & \ldots & \ldots \end{matrix}$$

The columns of the directivity matrix $D(\omega, \theta_{est})$ are composed of the vectors $d_j$ $$d_j=\exp(-i^*\cos(\theta_{est\,j})^*pos^*\omega/c) \quad \text{Eq. 4}$$

with $pos=[p_1\ p_2\ \ldots\ p_M]^T$ being the sensor positions, c the velocity of sound in air, i the square root of −1.

The $\theta_{est\,j}$ s are source direction of arrival (DOA) estimates for the R<=M sources which are available either from a priori knowledge or need to be determined iteratively in the following manner. It has been shown previously that using the inverse of the unmixing matrix W, the DOA of the separated outputs $Y_j$ can be estimated with $$\theta_{j,mn}(\omega)=\arccos(c^*arg([W^{-1}]_{nj}(\omega)/[W^{-1}]_{mj}(\omega))/(\omega^*\|p_m-p_n\|)) \quad \text{Eq. 5,}$$

where $\theta_{j,mn}(\omega)$ is the DOA of source j relative to sensor pair m and n, $p_m$ and $p_n$ being the positions of mic m and n respectively and c=340 m/s the sound propagation velocity. (See Mukai, R., Sawada, H., Araki, S., Makino, S., Frequency domain blind source separation for many speech signals, Proc. ICA 2004, pp. 461-469, 2004, which is incorporated herein by reference in its entirety.) When several microphone pairs are used, the DOA $\theta_{est\,j}$ for a specific IVA output Yj can be computed by plotting a histogram of the $\theta_{j,mn}(\omega)$ from equation (5) over all microphone pairs and frequencies in selected subbands (see for example, FIG. 7). The average $\theta_{est\,j}$ is then the maximum or center of gravity $(\Sigma_{\theta j=0\ldots180} N(\theta_j)/\Sigma_{\theta j=0\ldots180} N(\theta_j)$ of the resulting histogram $(\theta j, N(\theta j))$, where $N(\theta j)$ is the number of DOA estimates at angle $\theta j$. Reliable DOA estimates from such histograms may only become available in later learning stages when average source directions emerge after a number of iterations. The estimates in equation (5) are based on a far field model valid for source distances from the microphone array beyond $(2\sim4)^*D^2/\lambda$, with D the largest array dimension and $\lambda$ the shortest wavelength considered.

Objective (3) can be minimized by using the update rule $$\Delta W_{constr}(\omega)\sim=(dJ/dW)(\omega)=\mu^*\alpha(\omega)^*2^*(W(\omega)^*D(\omega,\theta)-C(\omega))D(\omega,\theta)^H \quad \text{Eq. 6,}$$

where $\alpha$ is a tuning parameter. When update equation (6) is added to IVA update equation (1) to determine the constrained IVA weight update $\Delta W(\omega)$, tuning $\alpha$ allows to suitably enforce the regularization constraint (3) depending on the spatial separability of the acoustic scenario and other considerations.

If the number of sources R is equal to the number of mixtures M, the choice of the desired beam pattern is set to $$C(\omega)=\text{diag}(W(\omega)^*D(\omega,\theta)),$$

thus nulling out sources from interfering orientations while preserving the beam strength into the desired orientation determined by the constrained IVA algorithm at each iteration. If R<M, the kth row of W for which no DOA has been identified will require a corresponding row of zero entries in $C(\omega)$, hence all sources are nulled out in this output channel and only background noise remains. Alternatively, if R<M, a dimension reduction can be performed first using PCA and then performing IVA on the reduced dimension subspace. The reduced dimension constraint gradient reads $$\Delta W_{constr}(\omega)=\mu^*\alpha(\omega)^*2^*(W(\omega)Wr(\omega)D(\omega,\theta)-C(\omega))^*(Wr(\omega)^*D(\omega,\theta))^H$$

with $C(\omega)=\text{diag}(W(\omega)Wr(\omega)D(\omega,\theta))$ and where Wr denotes the R*M PCA dimension reduction matrix.

Since beamforming techniques may be employed and speech is generally a broadband signal, it may be ensured that good performance is obtained for critical frequency ranges. If the far field model underlying equation (5) is invalid, near field corrections to the beam pattern may be to be made. Also the distance between two or more microphones may be chosen to be small enough (less than half the wavelength of the highest frequency) so spatial aliasing is avoided. In this case, it is not possible to enforce sharp beams in the very low frequencies.

Figure 5:
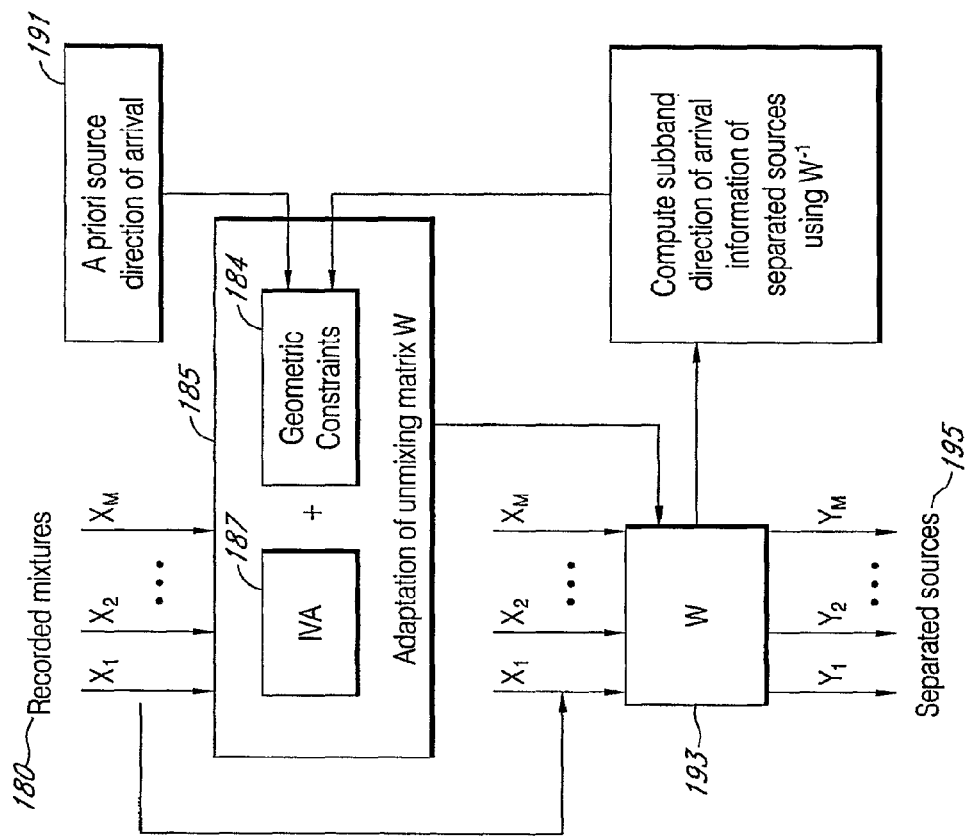
FIG. 5 is an illustration of one embodiment of a signal separation system.

FIG. 5 shows an overview of one system based on IVA combined with geometric constraints to avoid local minima and speed up convergence. A plurality of input mixtures ($X_1$, $X_2$ ... $X_M$) 180 is input into an adapting process 185. The adapting process 185 comprises both an IVA process 187 and a geometric constraints process 189. A priori knowledge 191 of, for example, the source or as another example, of the noise may contribute to the geometric constraints 189. Alternatively or in addition, derived information, explained in further detail below, may contribute to the geometric constraints 189. The adapting process 185 adapts an unmixing matrix W 193. The unmixing matrix $W(\omega)$ 193 receives the plurality of input mixtures ($X_1, X_2 \ldots X_M$) 180 and converts the input mixtures 180 into a plurality of separated signals ($Y_1, Y_2 \ldots Y_M$) 195. The plurality of separated signals ($Y_1, Y_2 \ldots Y_M$) 195 may include one or more source signals. Derived constraints may be derived by iteratively computing frequency subbands of partially separated signals using the inverse of the unmixing matrix $W(\omega)$.

Figure 6:
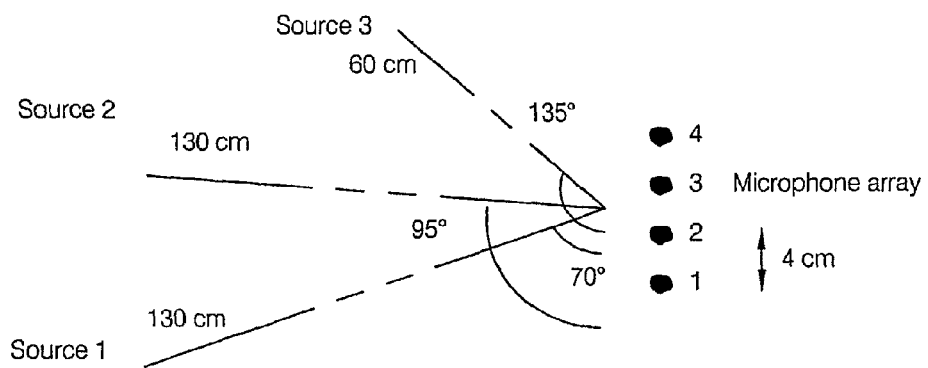
FIG. 6 is a schematic of an exemplary acoustic scenario.

FIG. 6 illustrates the approach in an acoustic scenario of 3 speakers and 4 microphones. Source 1, Source 2, and Source 3 are 130 cm, 130 cm, and 160 cm away from the microphone array, respectively. The microphone array includes four microphones, positioned in a line, such that the microphones are positioned 4 cm away from the adjacent microphone. Source 1, Source 2, and Source are positioned at 70°, 95°, and 135°, respectively, from the axis along the line of the microphones.

Figure 7:
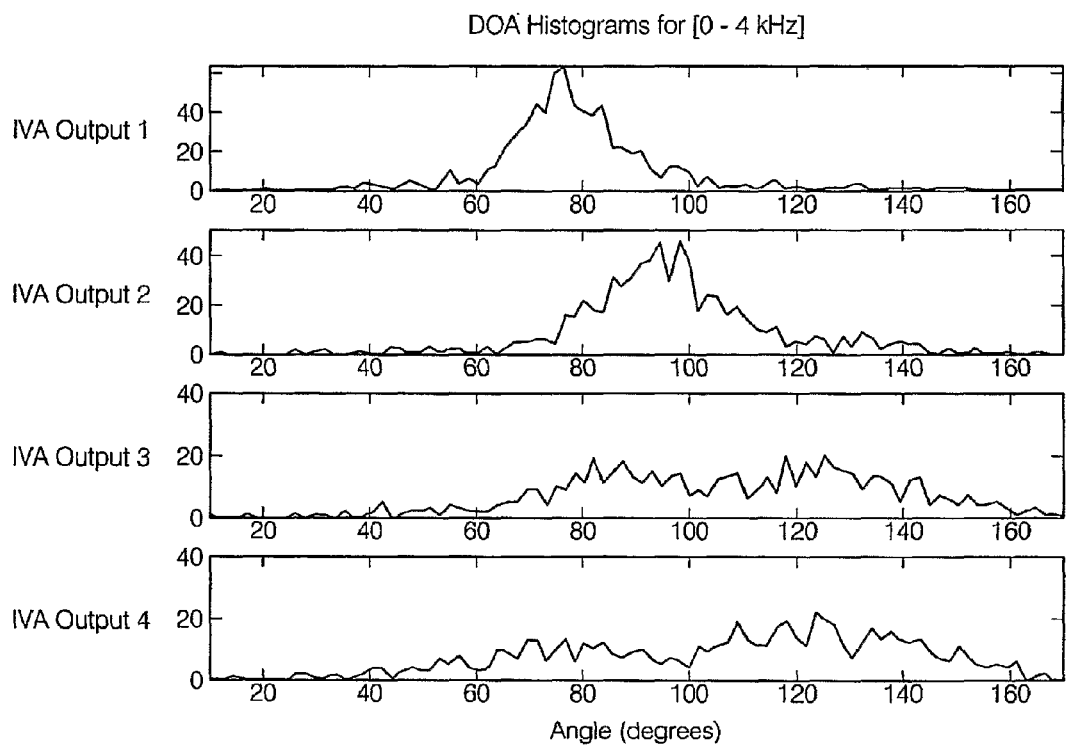
FIG. 7 shows direction of arrival histograms for IVA output using a prior art process applied to the example illustrated by FIG. 6.

In FIG. 7, histograms of estimated DOAs with equation (5) for microphone pairs (1,2), (2,3) and (3,4) over all frequencies in [0-4 kHz] band for each IVA separated output using learning rule (1) and activation function (2) are shown. IVA Outputs 1 and 2 correspond to Sources 1 and 2 respectively (compare FIG. 6), such that the histogram peaks at approximately 70° and 95°, corresponding to the position of Sources 1 and 2. IVA outputs 3 and 4 do not exhibit a similarly sharp peak, thereby indicating that no defined DOA is perceived in Outputs 3 and 4. The unconstrained IVA algorithm has thus failed to separate Source 3 and thus converged to a local minimum.

Figure 8:
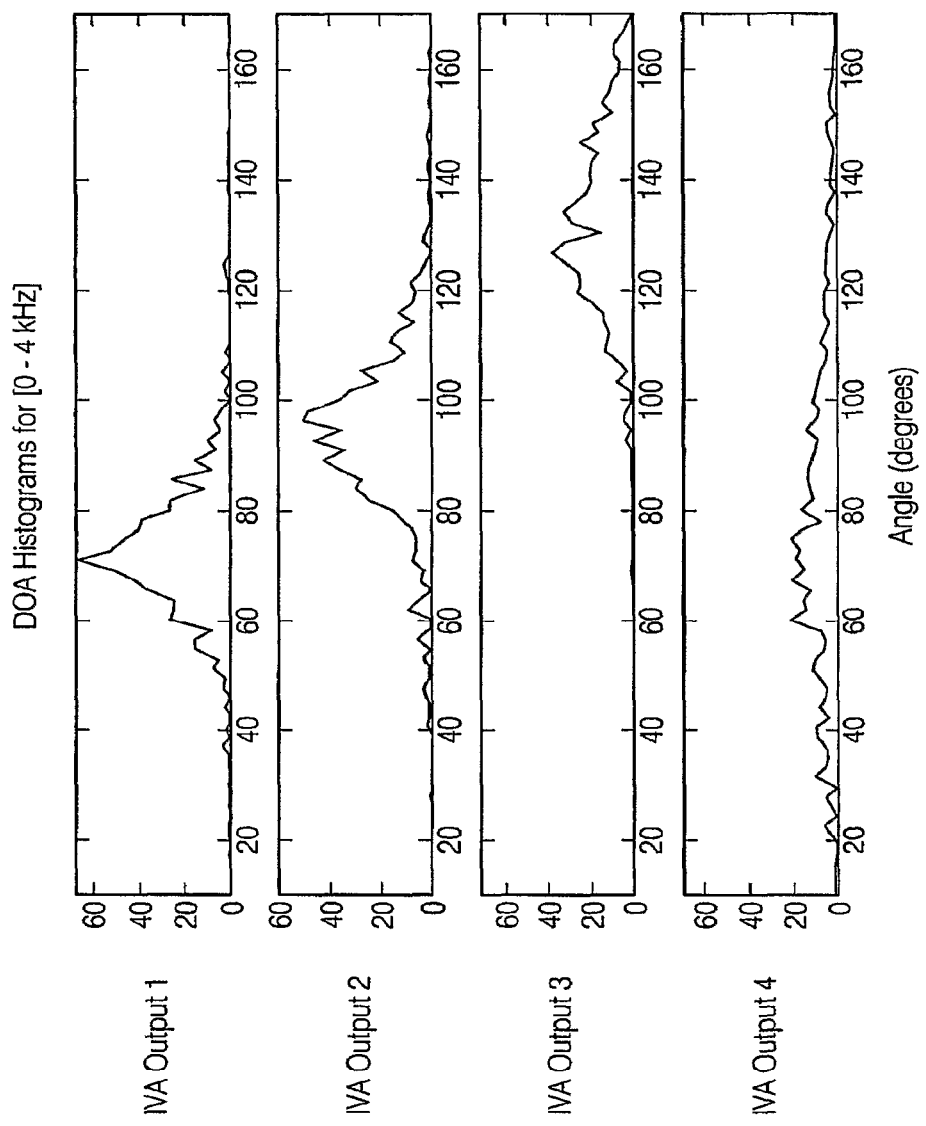
FIG. 8 shows direction of arrival histograms for IVA output using a signal separation process as described herein applied to the example illustrated by FIG. 6.

FIG. 8 on the other hand shows the histogram of DOA estimates from equation (5) over all microphone pairs and frequencies corresponding to IVA unmixing solution (update rule (1), activation function (2)) initialized at converged solution of constrained IVA (update eqs. (1) and (4), α=0.1). As opposed to FIG. 7, IVA Output 3 clearly corresponds to Source 3, as the peak of the histogram is located approximately at 135°. Thus, by using a constrained IVA rule for performing blind source separation, convergence to local minima is avoided and all 3 original sources are separated from the recorded mixture signals.

Table 1 illustrates that better final Signal to Interference Ratios (SIR) can be obtained using the constrained approach. Different constrained IVA approaches were evaluated through different values of α. The acronyms are explained as follows: IVA=IVA with update rule (1) using function (1); conIVA=constrained IVA using update rule composed of (1) added to (5) for different settings of α; IVAopt=IVA initialized at final solution obtained with conIVA(α=0.1).

TABLE 1

| SIR (dB) | Source 1 | Source 2 | Source 3 |
| --- | --- | --- | --- |
| Recording | −4.72 | −9.26 | −7.02 |
| IVA | 18.98 | 10.10 | 5.35 |
| convIVA (α = 2) | 2.13 | −3.78 | 2.63 |
| conIVA (α = 0.1) | 16.39 | 10.04 | 12.76 |
| IVAopt | 19.85 | 10.73 | 12.97 |

Figure 9:
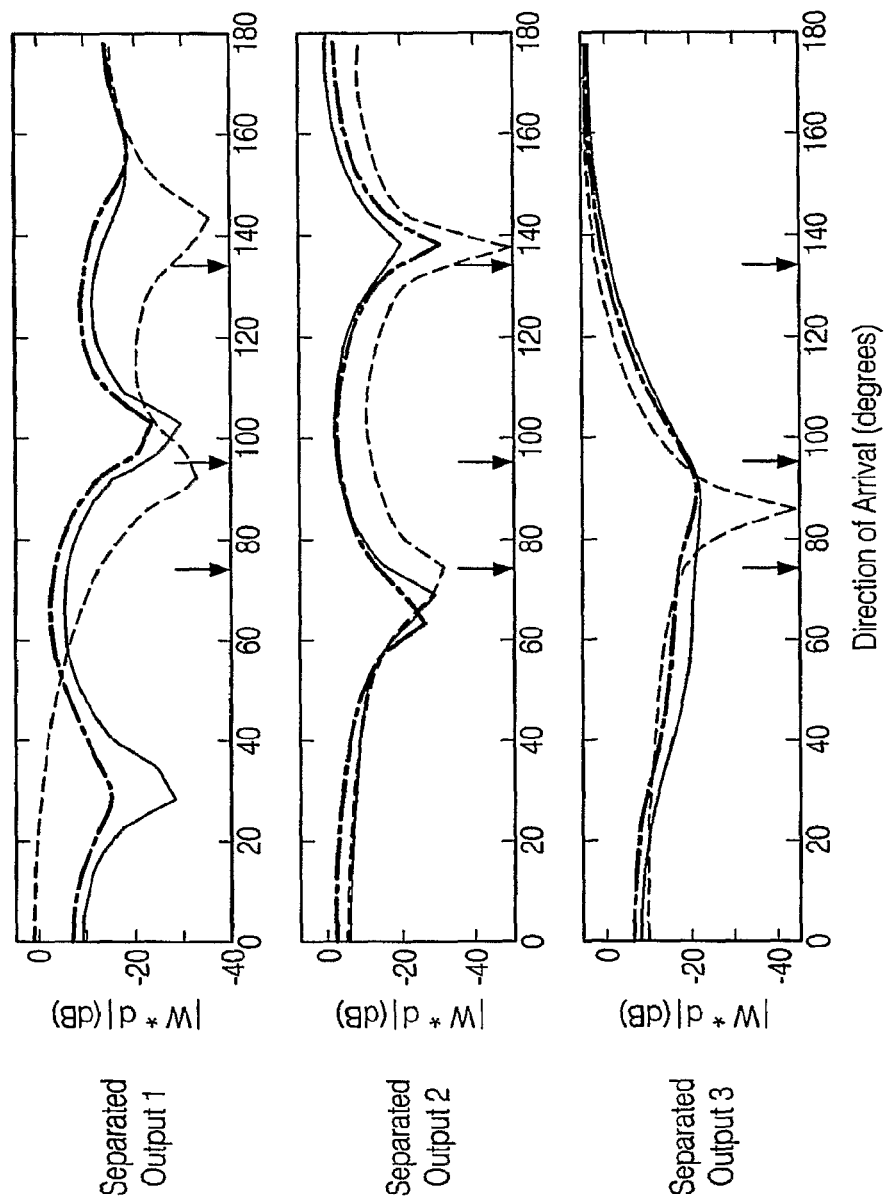
FIG. 9 is an illustration of the spatial filter characteristics of different processes applied to the example illustrated by FIG. 6.

To illustrate the physical impact of enforcing geometric constraints, FIG. 9 shows separated output beam patterns |W*d(θ)| obtained using constrained IVA (update rule (1) added to equation (5) with activation function (2)) at ω=2 kHz: Null beams are placed at DOA 76, 96, 134 degrees and different aggressiveness of constraint enforcement using α (equation 5) allows to adjust the depth of resulting null beams (dashed line for α=2; dashed-dotted line for α=0.1). The solid line corresponds to the optimum solution of unconstrained IVA (update rule (1) with function (2)) initialized with converged filters obtained from constrained IVA using α=0.1. One can see that tuning α allows to adjust the depth and width of beampatterns at select angles and thus a direct means of initializing the BSS solution in or steering it to a particular solution.

Frequency-Domain Signal Separation and Reordering Processing

In some embodiments, the present invention relates to systems and/or devices comprising signal separation performed in the frequency domain and reassigning the source assignments of the separated signals. The reordering may comprise reassigning the assignments within signal data corresponding to a specific frequency and/or a specific group of frequencies. It will be understood that the terms "reorder", "reassign", and "rearrange" may be used synonymously. In some embodiments, the reordering may comprise top-down, bottom-up, or linear processes as described herein. While in some embodiments, systems and devices may comprise transforming time-domain signals into spectral input signals, in other embodiments, the transforming is not a part of the systems and devices. In some embodiments, systems and devices comprise inverse transforming at least one separated frequency-domain signal into at least one time-domain signal, though in other embodiments, they do not. In some embodiments, signal separation comprises blind-source separation. In some embodiments, signal separation comprises Independent Vector Analysis (IVA) or Independent Component Analysis (ICA).

While specific reordering methods are described herein, it will be understood that any reordering process may be used. Additionally, it will be understood that while considering a reordering for data corresponding to a specific frequency and/or specific group of frequencies, the reordered assignments need not be fixed before proceeding to another frequency and/or group of frequencies.

Figure 10:
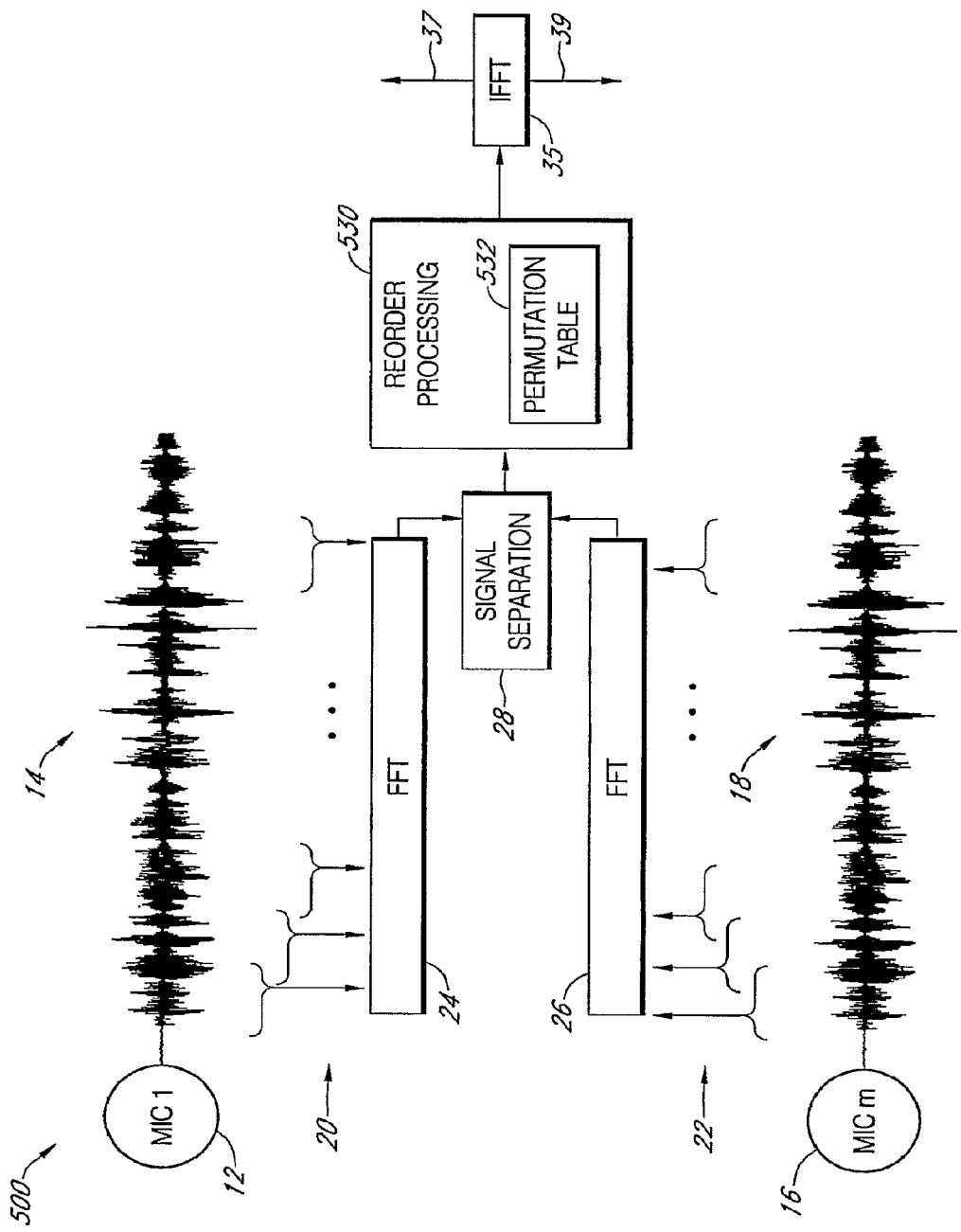
FIG. 10 is an illustration of one embodiment of a signal separation process.

System 500, as illustrated in FIG. 10, provides one process and system for separating signals and begins as System 10, as illustrated in FIG. 1. Multiple microphones, such as microphone 12 and microphone 16, receive signals. Properties of the microphones 12 and 16 and of the acoustic signals 14 and 18 generated by the microphones 12 and 16 are as described in System 10. As described above for System 10, the time-domain electric signals 14 and 18 may be sampled into sampling window sets 20 and 22 respectively.

As described for System 10, a fast Fourier transform (FFT) may then be performed on each sampling window of sampling window sets 20 and 22 by FFT processes 24 and 26, respectively. In this way, each FFT process 24 and 26 generates frequency domain information which is used as inputs to a signal separation process 28.

The signal separation process 28 may advantageously be a blind signal separation process, such as an ICA (independent component analysis) process, or another separation process. The signal separation process 28 may attempt to separate the output frequency domain data into independent signal sources. The independent signal sources may include two signal sources, as shown in FIG. 10, or more signal sources.

More particularly, the output data is placed into frequency bins and stored temporarily in a permutation table 532. The permutation table 532 holds separated frequency domain data.

However, the signal separation process 28 often fails to correctly assign a specific output data element to the correct signal source. Typically, a frequency bin has data output elements for each expected independent source, which is also typically the number of microphones used. For example, a device may have 3 microphones, so each frequency bin will have 3 output data elements. To correctly separate the signals, each of the output data should be associated with the correct signal source. In some cases, the output data may be incorrectly associated with a signal source. This misassigmment of frequency data is typically known as the permutation problem, and leads to distortion, separation failure, or other undesirable effects. Accordingly, system 500 may comprise a reorder process 530 for ordering the output data for each frequency bin in the permutation table 532. The permutation table 532 is therefore reordered to comprise a plurality of separated components, each component comprising a plurality of data points, each data point corresponding to the signal separation result of a frequency bin assigned to the component.

Once the permutation table 532 has been properly ordered, the corrected frequency domain data is passed to an inverse fast Fourier transform process (IFFT) 35. Each separated component of the reordered permutation table may then be transformed by the IFFT process 35 to correspond to a time-domain output, such as time-domain outputs 37 and 39. In some instances, there will be more than two time-domain outputs. One of the time domain outputs may be an estimate of the source signal and one or more of the outputs may be an estimate of one or more noise signals. In some instances, not all of the separated components of the separated frequency bin data 29 are transformed by the IFFT process 35. For example, only the separated component corresponding to the source signal may be transformed by the IFFT process 35.

Figure 11:
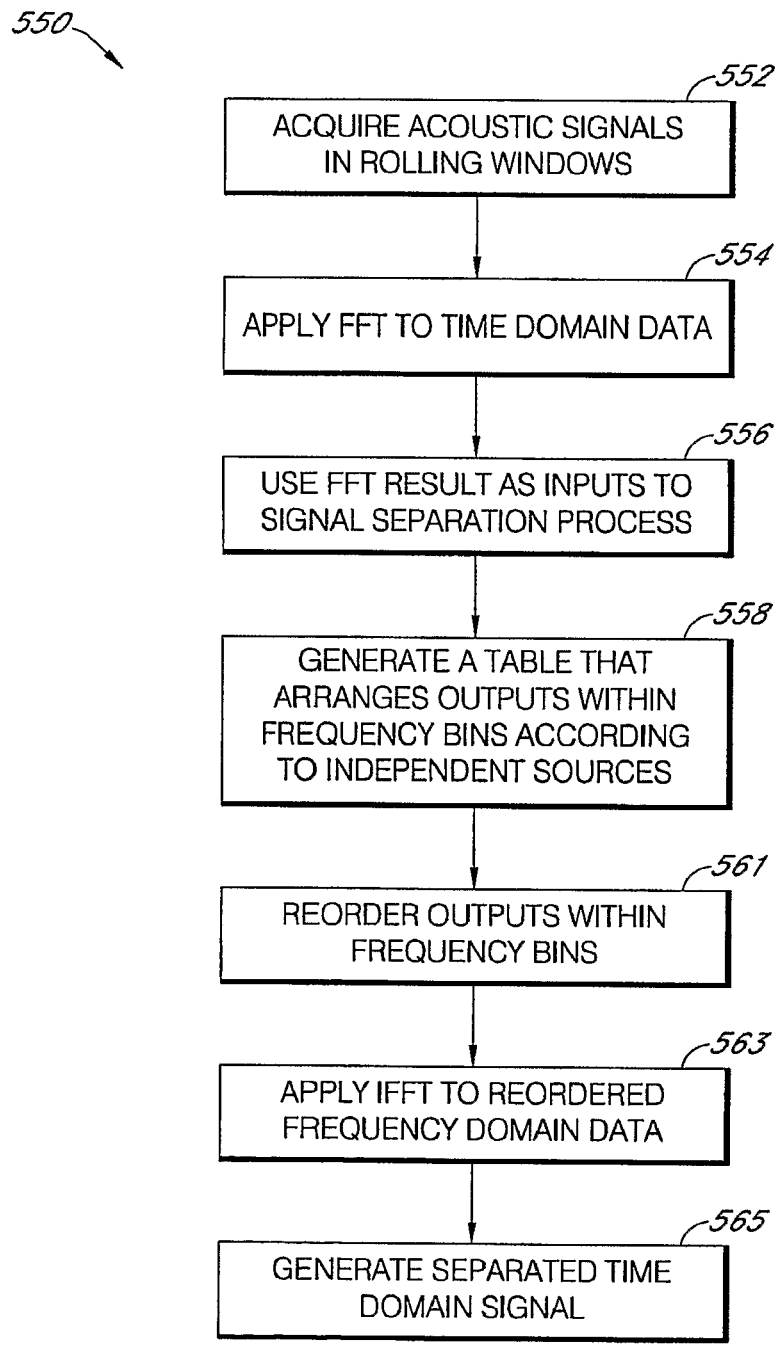
FIG. 11 is a flowchart of one embodiment of a separation process.

In some embodiments, the present invention relates to a separation process 550, as illustrated in FIG. 11. At step 552 of the process 550, acoustic signals are acquired in rolling windows. At step 554 of the process 550, a fast Fourier transform (FFT) is applied to the time domain rolling windows to create frequency domain data. At step 556 of the process 550, the resulting frequency domain data, otherwise referred to as FFT data, is used as channel inputs to a signal separation process. At step 558 of the process 550, a permutation table may be generated that arranges the outputs of the signal separation process within frequency bins according to independent sources. At step 561 of the process 550, a process applied to the permutation table may reorder the output data within the frequency bins, such that within each frequency bin, the assignment of the sources may be reordered to correspond with data output from the signal separation process. At step 563 of the process 550, the frequency domain reordered data may be processed by an IFFT. At step 565 of the process 550, the IFFT may then generate a separated time domain signal. Alternatively, only the frequency domain separating weights may be sent through the IFFT and the time domain mixture signals may be filtered with the obtained time domain separating filters.

Figure 12:
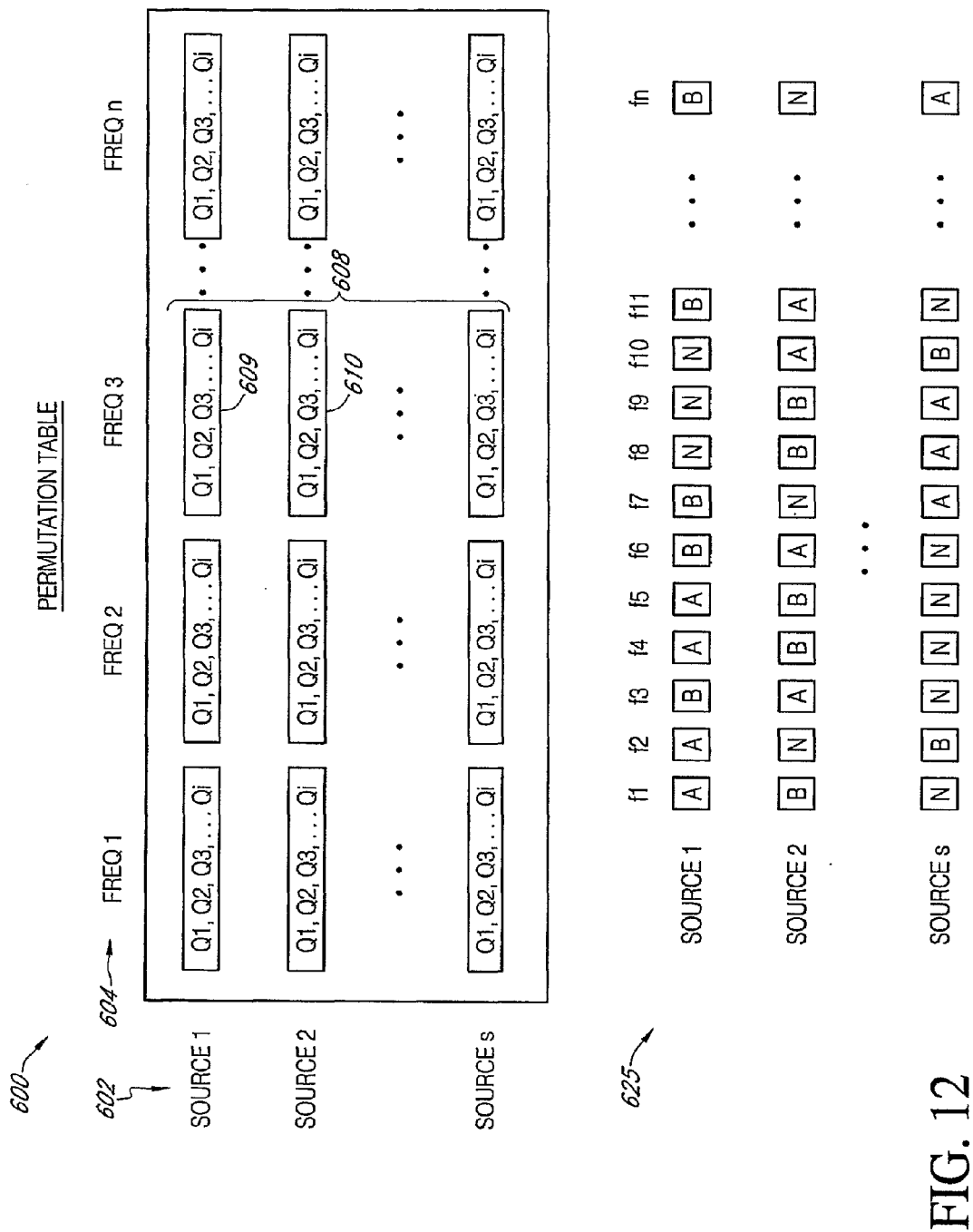
FIG. 12 is an illustration of a permutation table for one embodiment of a signal separation process.

An example of a permutation table is illustrated in FIG. 12. Permutation table 600 includes an identification of independent signal sources 602 and an indication of available frequency bins 604. Typically, the number of signal sources will be related to the number of microphones in the system. For example, if a device has three microphones, it may be able to identify up to three independent sources. The number of frequency bins 604 may be dependent on the type of fast Fourier transform performed, as well as the number of data points in the FFT sample block and sampling window. Each frequency bin, such as frequency bin 608, includes a set of output data, such as output 609 and output 610. Each output includes a set of complex valued data representing all the sample windows. For example, frequency bin 608 has complex outputs 609 and 610, and output 609 has complex valued data Q1, Q2, Q3 which represent the "FREQ3" frequency content for the first three sample windows. For example, if 240 sample windows are taken during a period, then each output, such as output 109, will have 240 complex values, with each value representing data element in one frequency bin for one sample window.

In order to improve permutation reorder results, a minimum specified length of sample data may be required. It has been found, for example, that three seconds of time domain data provides desirable separation results. If sampling at 8 kHz, and if the sample window is set at 200 points, then each sample window is about 25 ms in length. The sample windows may overlap, so additional sample windows may be used to consume the three seconds of time. For example, if each sample window overlaps by about 100 points, then about 240 sample windows will consume three seconds of time. It will be appreciated that the overall length of time, number of sample windows, overlap, length of windows, and sampling rate may be adjusted.

Table 625 shows a permutation table having sources listed on one axis and frequency bins listed on another axis. Each output in the frequency bins has been assigned a letter, either A, B, or N. For purposes of discussion, the letters A, B, and N represent signals from a respective signal source. In this way, a perfectly separated signal would have all of the "A's" aligned with one of the sources, all the "B's" aligned with another source, and all of the "N's", associated with another source. However, it will be appreciated that practically such perfection is unlikely to occur, and some misassignment is generally acceptable. However, improved clarity and separation efficiencies are seen using the reordering processes discussed herein.

Figure 13A:
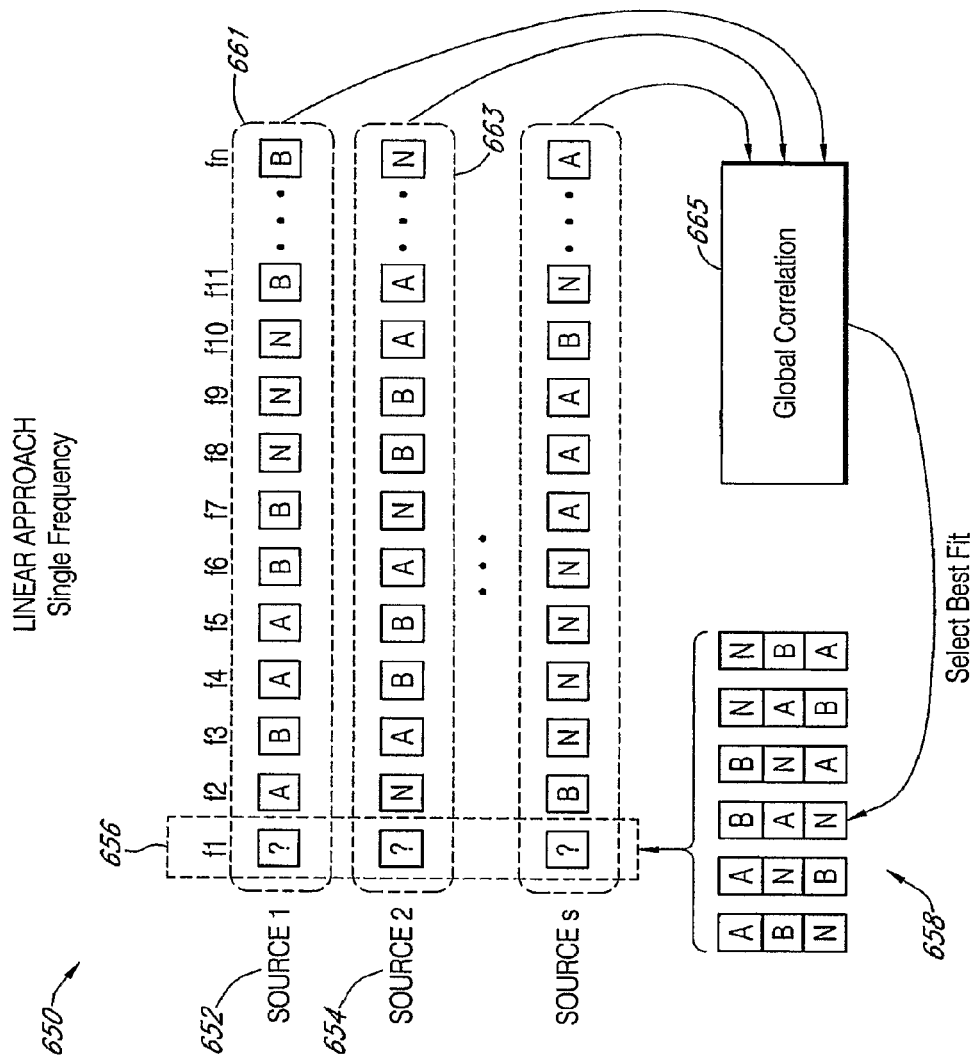
FIGS. 13A and 13B are illustrations of reordering a permutation table with an embodiment of a signal separation process.

Referring now to FIG. 13A, a system for reordering a permutation table is illustrated. System 650 has a permutation table having sources, such as source 652 and source 654. The permutation table shows that the signal separation process has assigned separated output data within respective frequency bins, with each output being assigned to a particular source. As illustrated by the letter labels, the separation process has failed to accurately associate particular sources with the correct output data in many of the frequency bins. Accordingly, a reordering process may be advantageously applied. The reordering system 650 is a linear approach which begins with a predetermined frequency bin, such as frequency bin 656. In the linear approach, outputs in the selected frequency bin are rearranged until a global cost function is minimized. More particularly, the outputs for each frequency bin are reordered into all available combinations, and for each permutation, the cost function for each source is calculated.

In system 650, frequency bin 1 was originally arranged to A-B-N. Since three sources are illustrated, six different permutations may be arranged within the frequency bin. These available arrangements 658 are sequentially applied. For each arrangement, a cost value is calculated for each source. For example, when frequency one is set to A-N-B, then a cost is calculated for source one 652, and for source two 654, as well as for source s. This cost function may be a global correlation feature 665. It will be appreciated that other types of cost functions may be used, or that other types of algorithms may be used for determining a best fit. Depending on the comparisons, the arrangement having the best fit is selected. As illustrated in system 650, the arrangement B-A-N is selected as having the best fit.

Figure 13B:
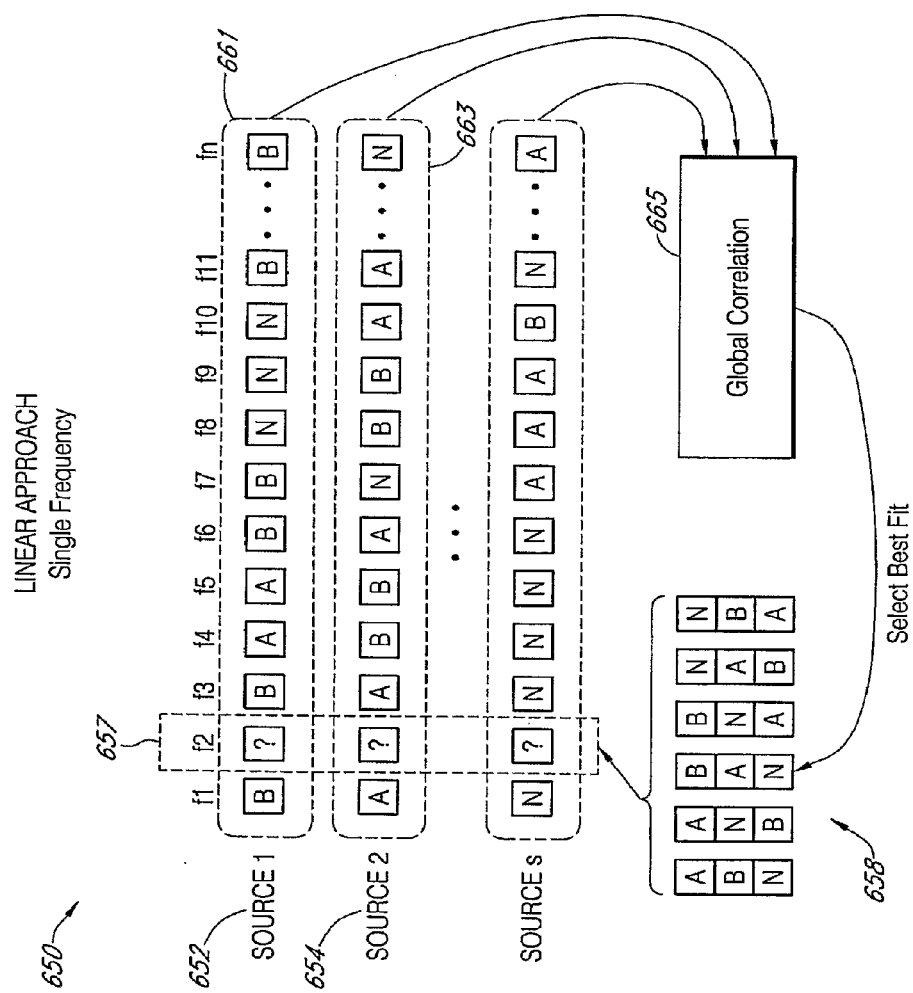

Accordingly, the arrangement B-A-N is fixed into frequency one, and system 650 proceeds to rearrange frequency 2 as shown by block 657 in FIG. 13B. Once again, the linear approach rearranges the outputs within the frequency bin, calculates cost functions for each source, and then selects the arrangement having the lowest overall cost function, or the best fit. As illustrated in FIG. 13B, the arrangement B-A-N has the best fit for f2. Accordingly, B-A-N will be fixed in to f2, and the linear approach would proceed to f3. This process continues until all frequencies have been completed. It will be appreciated that multiple passes may be used.

Figure 14:
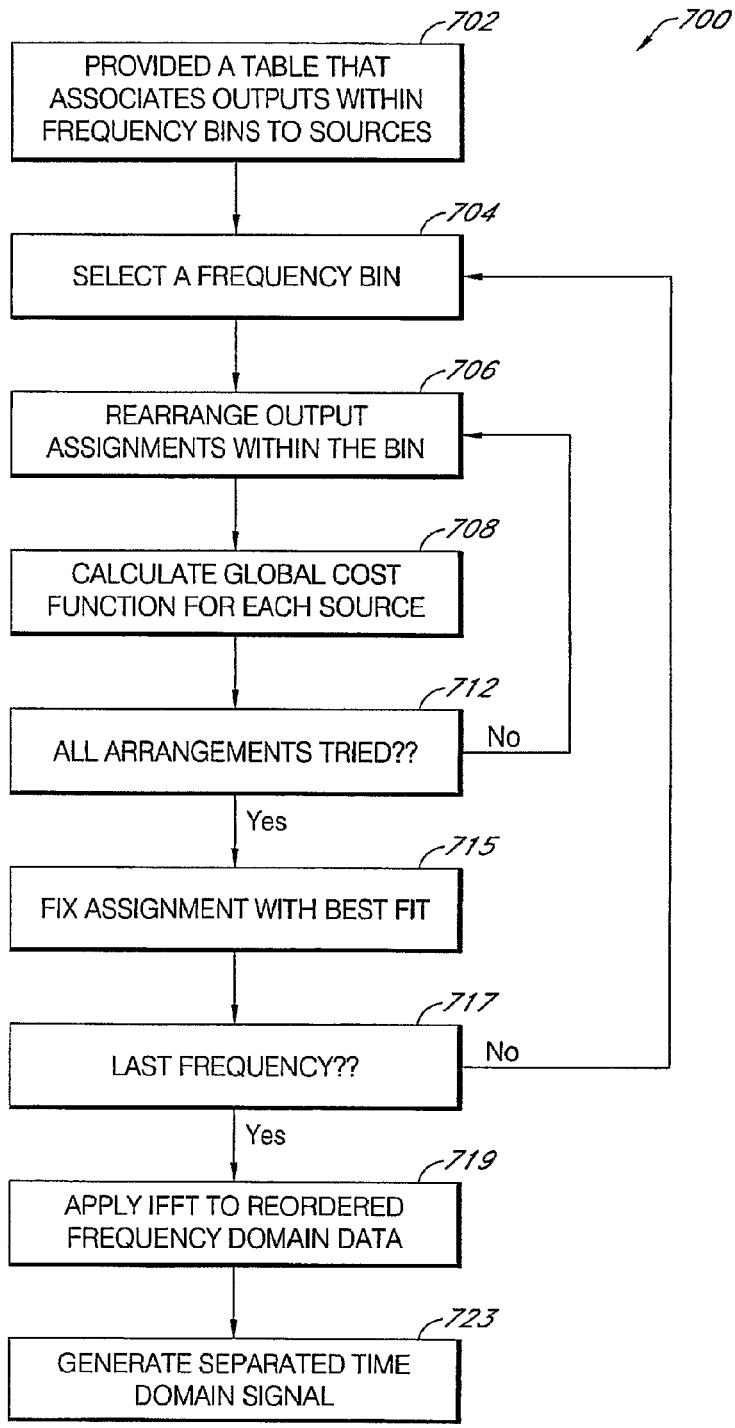
FIG. 14 is a flowchart of a process for reordering a permutation table with an embodiment of a signal separation process.

In some embodiments, the present invention relates to a process for rearranging a permutation table, as shown in FIG. 14. Process 700 begins at step 702, where a table that associates outputs within frequency bins is provided to signal sources. At step 704 of the process 700, one of the frequency bins is selected. In one example, the frequency bin may be the first frequency bin, although other ways of selecting a starting bin may be used. At step 706 of the process 700, output assignments are rearranged within the frequency bin, and at step 708 of the process 700, a global cost function is calculated for each source. At step 712 of the process 700, it is verified that all possible arrangements have been tried. If all possible assignment combinations have not been tried, then the process 700 continues by repeating steps 706, 708 and 712. Otherwise, the process 700 continues with step 715, where the arrangement having the best overall ft is fixed as the output assignments for that frequency bin. Step 715 may comprise comparing the resulting global cost functions calculated in step 708. At step 717 of process 700, it is verified that all frequency bins have been tested and fixed. If all frequency bins have not been tested, then the process 700 may continue by repeating steps 704, 706, 708, 712, 715 and 717. Otherwise, the process 700 continues with step 719, where an IFFT is applied to the reordered frequency domain data. At step 723 of process 700, a time-domain signal is generated.

Figure 15A:
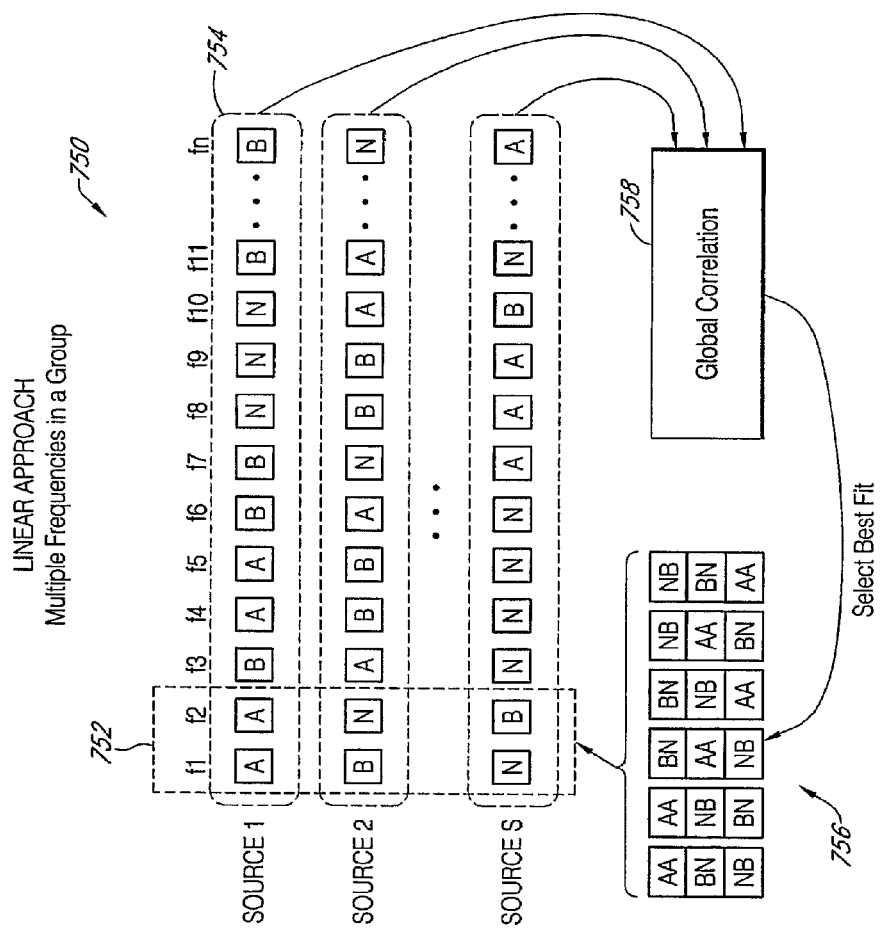
FIGS. 15A and 15B are illustrations of reordering a permutation table with an embodiment of a signal separation process.
Figure 15B:
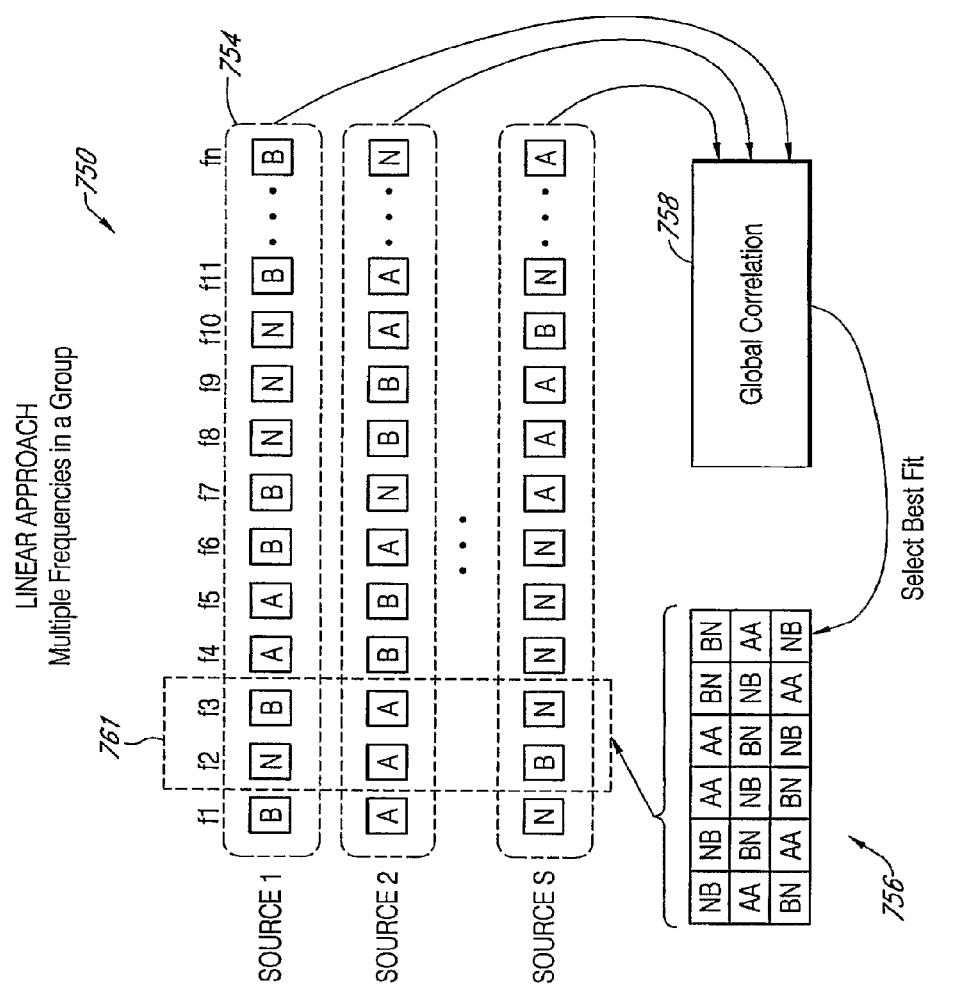

In some embodiments, the present invention relates to a multiple group reordering system, as shown in FIG. 15A. Reordering system 750 has multiple sources assigned along one axis and frequency bins assigned along the other axis. A group of frequency bins is selected as shown in block 752. Rather than operating on a single frequency bin as previously discussed, system 750 operates on multiple bins in concert. More particularly, the multiple bins 752 originally had the combination of A-A, B-N, and N-B. For purposes of rearranging, the outputs in frequency bins 1 and 2 are treated in concert as a single element. In this way, six different arrangements are available as shown by alternate arrangements 756. Each of the alternate arrangements is sequentially tested, and a cost function is calculated for each source, such as source 754. A global correlation or cost function 758 is applied for each arrangement, and the arrangement providing the best fit is selected. Once selected, the best fit arrangement is inserted into the table. As shown in FIG. 15A, the arrangement B-N, A-A, and N-B has provided the best fit. Accordingly, that arrangement is inserted into f1 and f2 as shown in FIG. 15B.

Process 750 proceeds by selecting another group of frequency bins 761. As illustrated, this group may overlap with the previous group. It will also be appreciated that any way of selecting groups may be used. Process 750 proceeds as previously discussed. For example, f2 and f3 are treated in concert as a single element, and so selection arrangements 756 shows that six alternative arrangements are available. Each of the arrangements is tried, and global cost functions calculated for each arrangement. The arrangement having the best correlation is selected, and that arrangement is then inserted into the permutation table. The advancement of the frequency bin groups continues until all frequencies have been used. It will be appreciated that multiple passes may be used. It will also be appreciated that the multiple group process 750 may be combined with the single set process 700 to provide multiple passes of reordering. For example, a first pass may use single set reordering, and then one or more passes may be made with multiple set reordering. It will also be appreciated that the multiple set reordering may use 2 or another number of frequency bins in a set.

Figure 16:
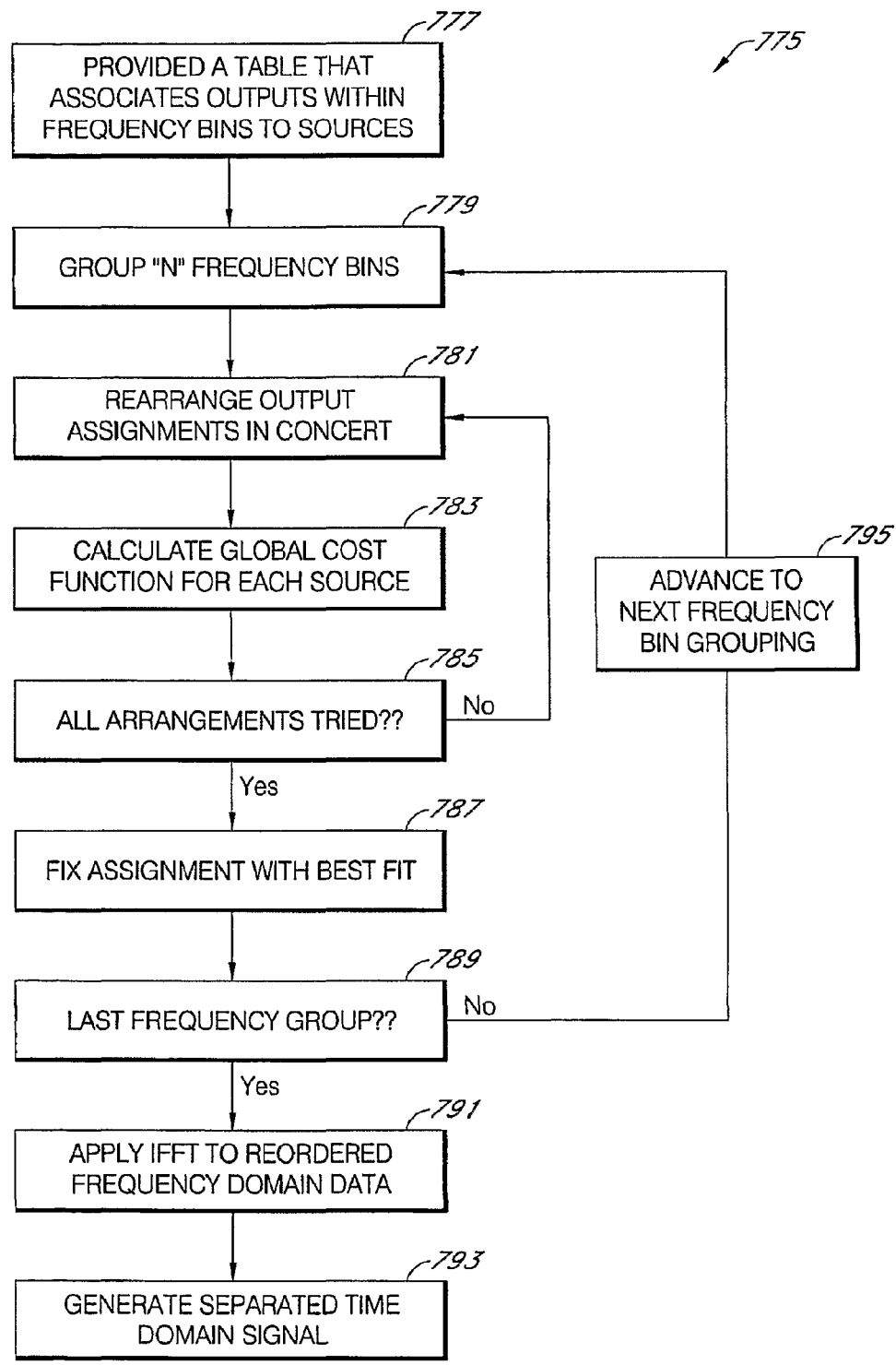
FIG. 16 is a flowchart of one embodiment of a process for reordering a permutation table with a signal separation process.

In some embodiments, the present invention relates to a process for rearranging a permutation table, as shown in FIG. 16. Process 775 begins at step 777, where a table that associates outputs within frequency bins is provided to signal sources. At step 779 of the process 775, a number of frequency bins are selected together as a group. In the discussed example, the number of grouped frequency bins is 2, although a different number of bins may be selected. At step 779 of the process 775, the output assignments may be rearranged in concert. At step 783 of the process 775, for each arrangement, a global cost function may be calculated for each source. At step 785 of the process 775, it may be determined whether all arrangements have been tested, which for 3 signal sources will be six different available arrangements. If all arrangements have not been tested, then process 775 repeats steps 781, 783 and 785. Otherwise, process 775 continues with step 787, at which the best fit assignments are fixed. Step 787 may comprise comparing all global cost functions and identifying the best-fit assignment as that associated with the minimum global cost. At step 789 of the process 775, it may be determined whether all frequency groups have been tested. If not all frequency groups have been tested, then process 775 advances to the next frequency block by repeating steps 779, 781, 783, 785, 787 and 789. This advancement may be a single bin at a time, or may be done according to a different schedule. Once all the frequencies have been reordered, other passes may be made with the multiple group process, or another reordering process. At step 791 of the process 775, an IFFT may be applied to the reordered outputs, and at step 793 of the process 775, a separated time domain signal may be generated.

Figure 17:
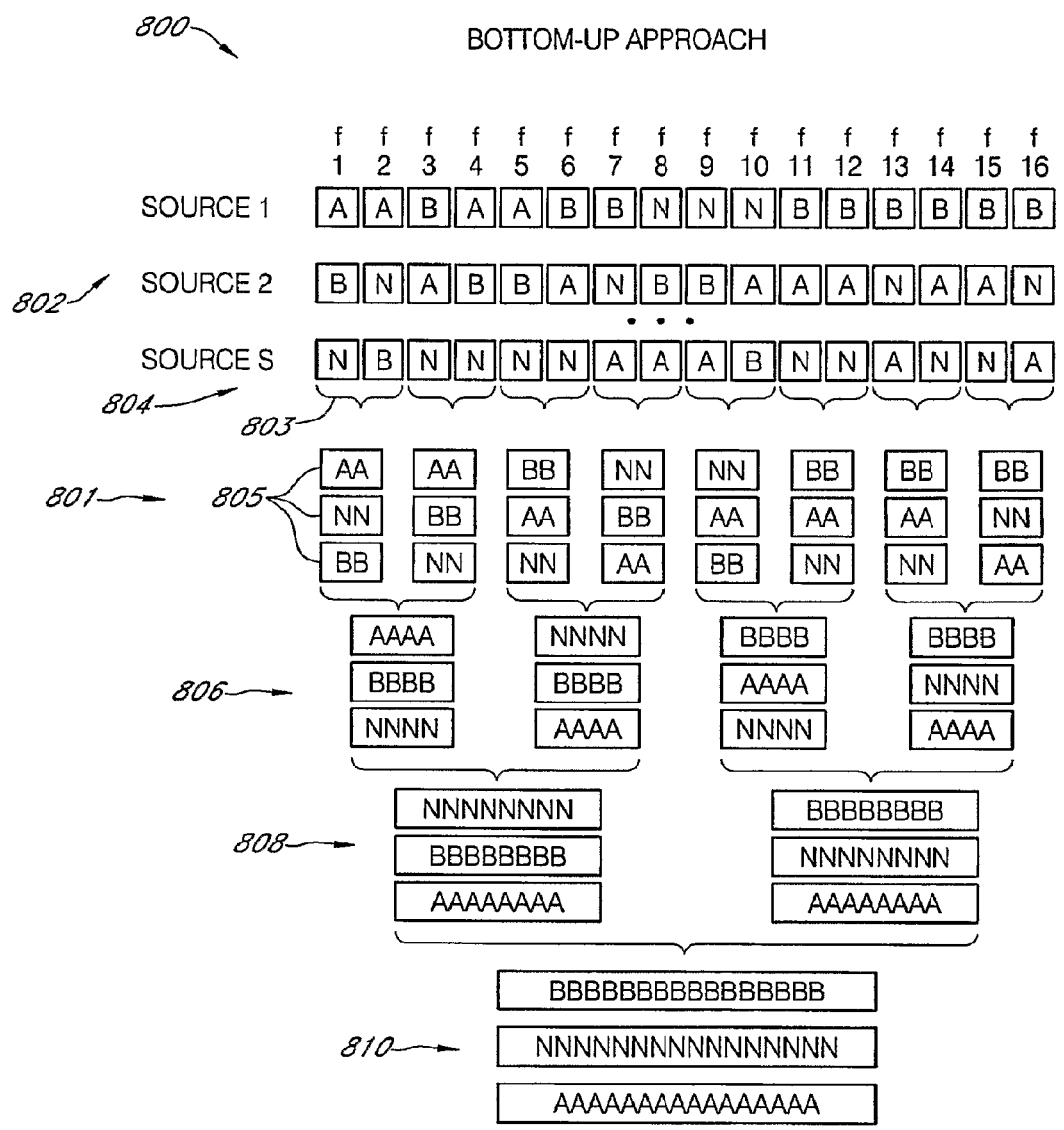
FIG. 17 is an illustration of one embodiment of reordering a permutation table with a signal separation process.

In some embodiments, the present invention relates to a bottom-up system for rearranging a permutation table, as shown in FIG. 17. Reordering process 800 has frequency bins associated with sources 802. In using method 800, frequency bins are grouped into pairs as shown by line 803. For example, frequency bins f1 and f2 are paired, frequency bins f3 and f4 are paired, and frequency bins f5 and f6 are paired. For each pair, one member of the pair is fixed, while the outputs for the other member of the pair are rearranged. Take, for example, pair 803 representing frequency bins f1 and f2. Frequency bin f2 is fixed, so the second element in set 805 is fixed to A-N-B. With the second member of the pair fixed, the first member of the pair (f1) is rearranged, and a cost function is calculated within each group for each rearrangement. The arrangement of outputs having the best fit is then selected and fixed. In this way, set 805 is arranged to AA, NN, and BB. Method 800 pairs each of the frequency bins and generates the best fit arrangement for each pair in the first level 804. Each of the resulting sets in the second level 801, such as set 805, are likewise paired into groups and the output values of the second member of the pair are fixed, while the output values for the first member of the pair are rearranged. For example, the first set in level 3 806 shows that outputs AA, BB, and NN are fixed, and then the outputs for the first member of the pair (805) are rearranged to identify the best fit. Once the best fit is found, a new combined set is created. In a similar manner, the sets in level 3 806 are paired into groups, and the process continued to generate sets in level 4 808. Finally, the sets are paired and combined to generate the final output 810.

Figure 18:
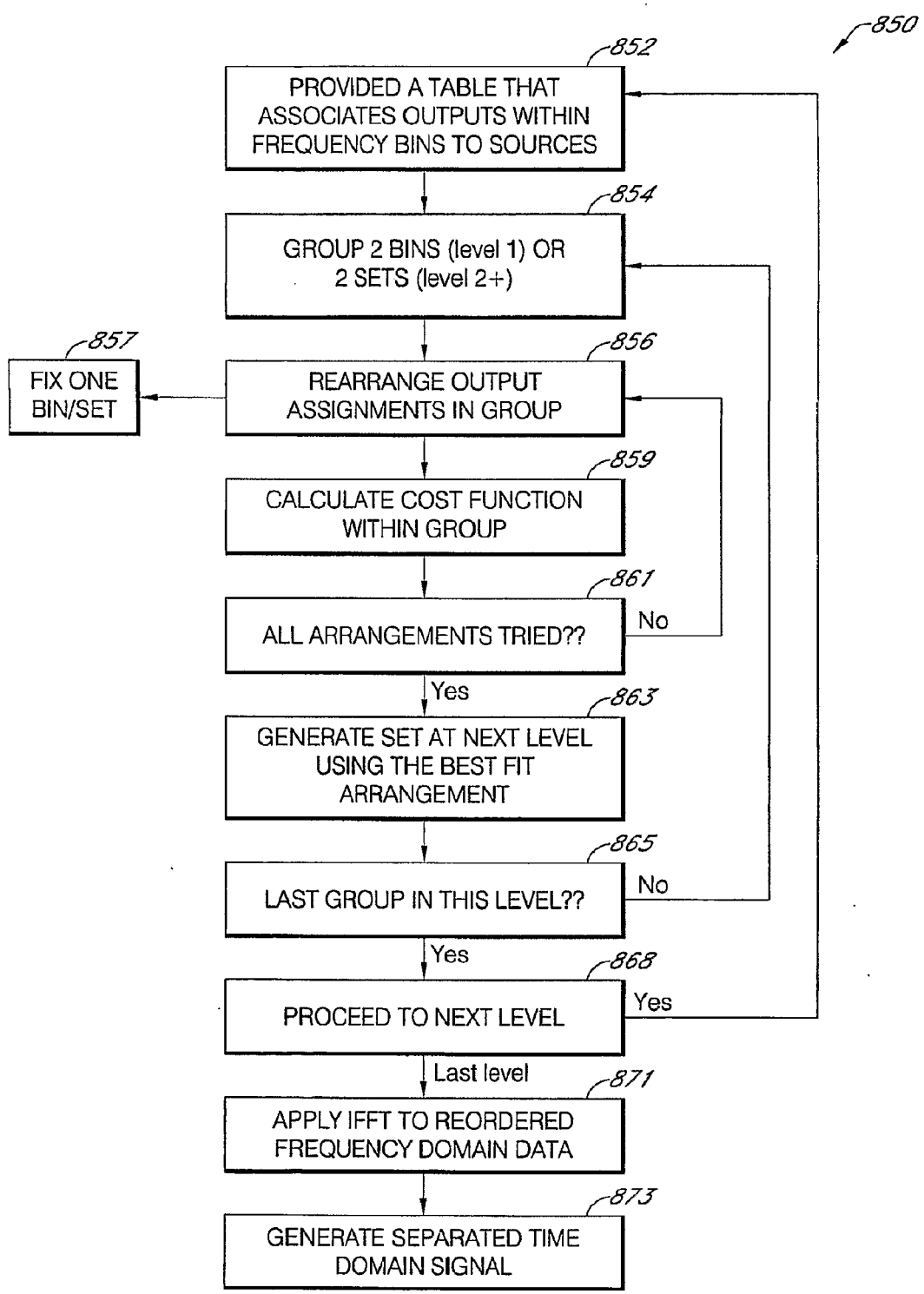
FIG. 18 is a flowchart of one embodiment of a process for reordering a permutation table with a signal separation process.

In some embodiments, the present invention relates to a bottom-up process for rearranging a permutation table, as shown in FIG. 18. Process 850 begins at step 852, where a table that associates outputs within frequency bins is provided to signal sources. At step 854 of the process 850, two of the sets are selected and paired in the same level. For the first selection, the each set may correspond to individual frequency bins, while in higher levels each set may correspond to a group of frequency bins. At step 856 of the process 850, the outputs or elements are rearranged. More particularly, as shown in step 857, the values of one of the sets are fixed, while the values of the other member of the pair are rearranged. At step 859 of the process 850, a cost function is calculated within each group. At step 861 of the process 850, it is determined whether all arrangements have been tried. If all arrangements have not been tried, then the process 850 continues by repeating steps 856, 857 and 859. Otherwise, the process 850 continues at step 863, where a set is generated at the next level fixed using values of the best arrangement. At step 865 of the process 850, it is determined whether the group is the last group in the current level. If it is not, process 850 continues by repeating steps 854, 856, 857, 859, 861, 863 and 865. Otherwise, process 850 continues at step 868, where it is determined whether to proceed to the next level. The process 850 may continue through multiple levels, generating sets with progressively more and more bins. For each time that the process 850 proceeds to the next level, steps 854, 856, 857, 859, 861, 863, 865 and 868 are repeated. Once the last level has been reached, process 850 continues at step 871, where an IFFT is applied to the output data. At step 873 of process 850, a time domain signal may be generated.

Figure 19A:
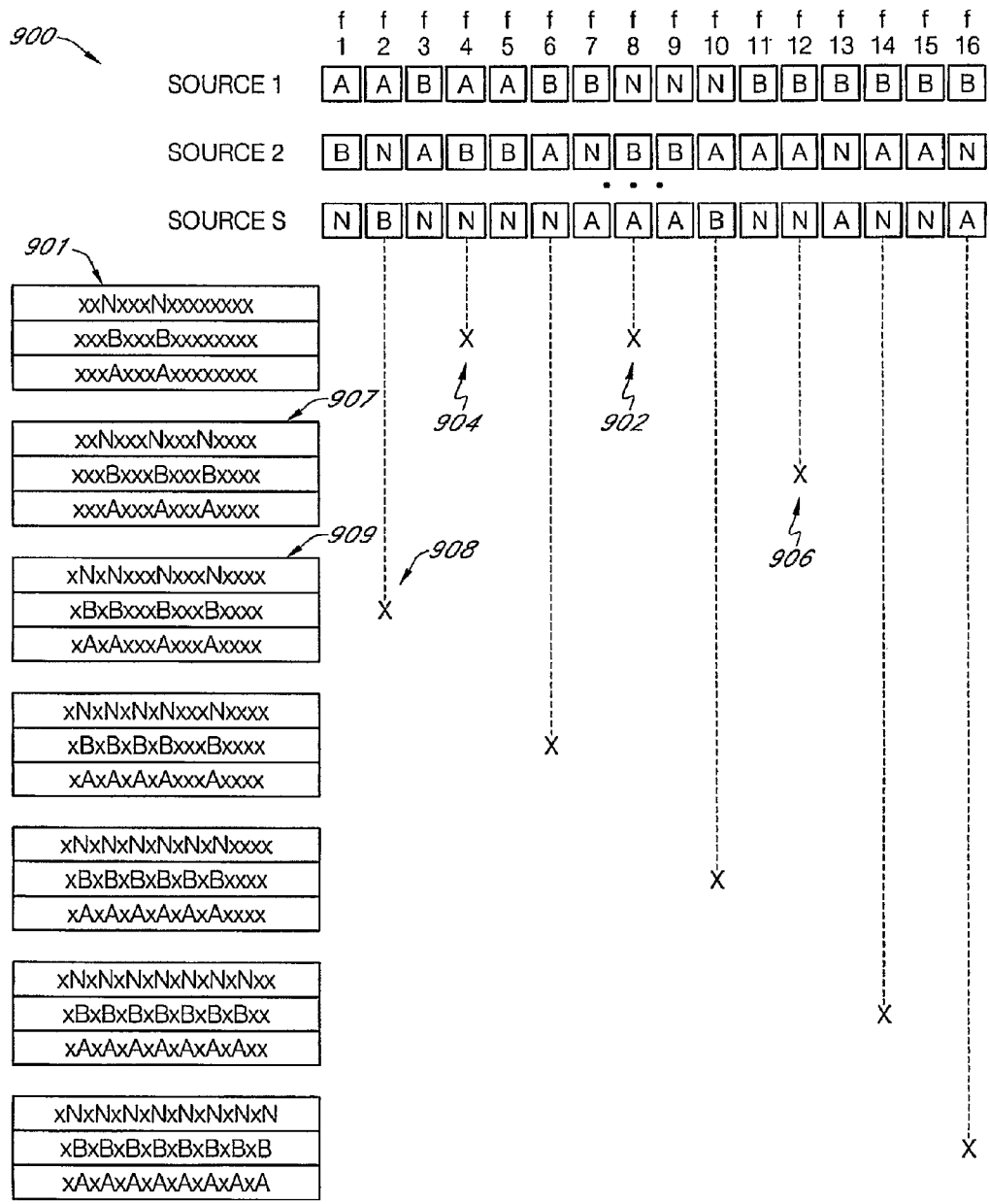
FIGS. 19A through 19C are illustrations of one embodiment of reordering a permutation table with a signal separation process.
Figure 19B:
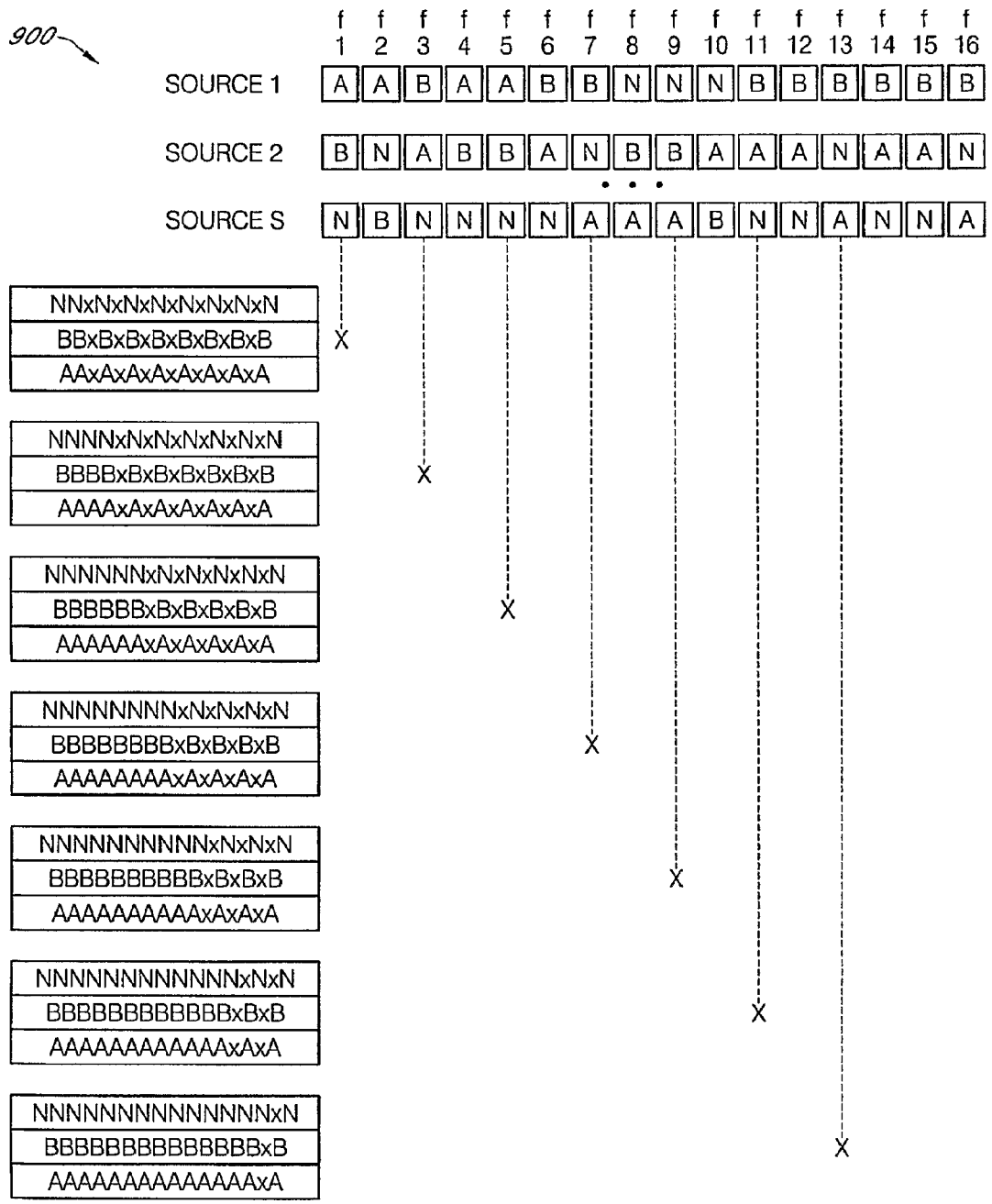
Figure 19C:
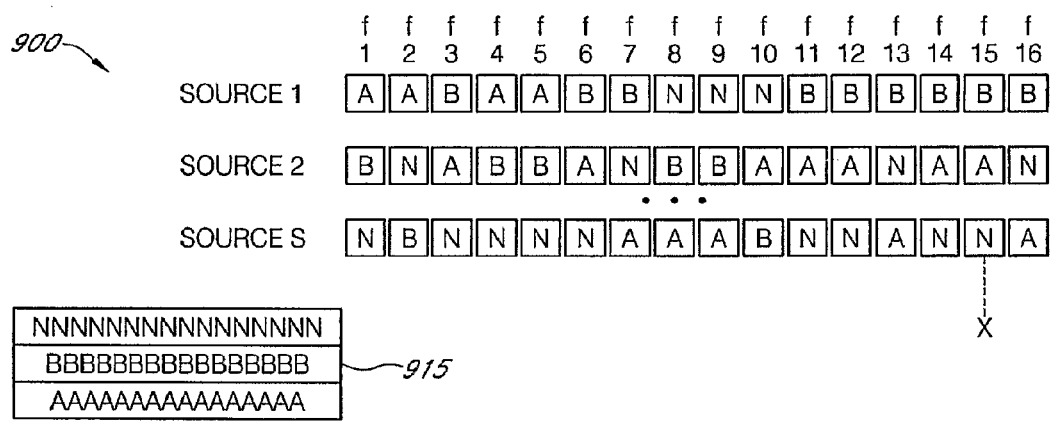

In some embodiments, the present invention relates to a system for rearranging a permutation table, as shown in FIG. 19A through 19C. Ordering process 900 has sources listed on one axis while frequency bins are listed on another axis, as shown in FIG. 19A. In method 900, an initial two frequencies, such as frequencies 902 and 904 are selected for comparison. More particularly, the values for the center frequency 902 are fixed, and the output values for frequency 904 are rearranged until the cost functions of the bins in the pool 901 are minimized. In this way, the output for frequency bin 904 is rearranged until a best fit is found with output 902. In the illustration, output 902 is selected as the center frequency of the frequency bins, while frequency 904 is a quarter frequency. It will be appreciated that other mechanisms may be used to select the initial two frequencies. A third frequency, which is also a quarter frequency 906, is selected to add to the pool next. The values for frequencies 902 and 904 have been fixed, and the outputs for frequency bin 906 are rearranged until a best fit is found, and then the best fit values are inserted into pool 907. In a similar manner, ⅛ frequency 908 is applied next, while frequencies 902, 904, and 906 are fixed in the pool. In this way, frequency outputs for frequency bin 908 are rearranged until a best fit is found, and the best fit values are inserted into the frequency pool 909, as shown in FIG. 19B. The method 900 continues adding other ⅛ frequencies and then advances to the 1/16 frequencies (and if any, 1/32 frequencies, 1/64 frequencies etc.) until the entire pool 901 is filled as shown by block 915, as shown in FIG. 19C. It will be appreciated that other processes of selecting and ordering frequency comparisons may be used.

Figure 20:
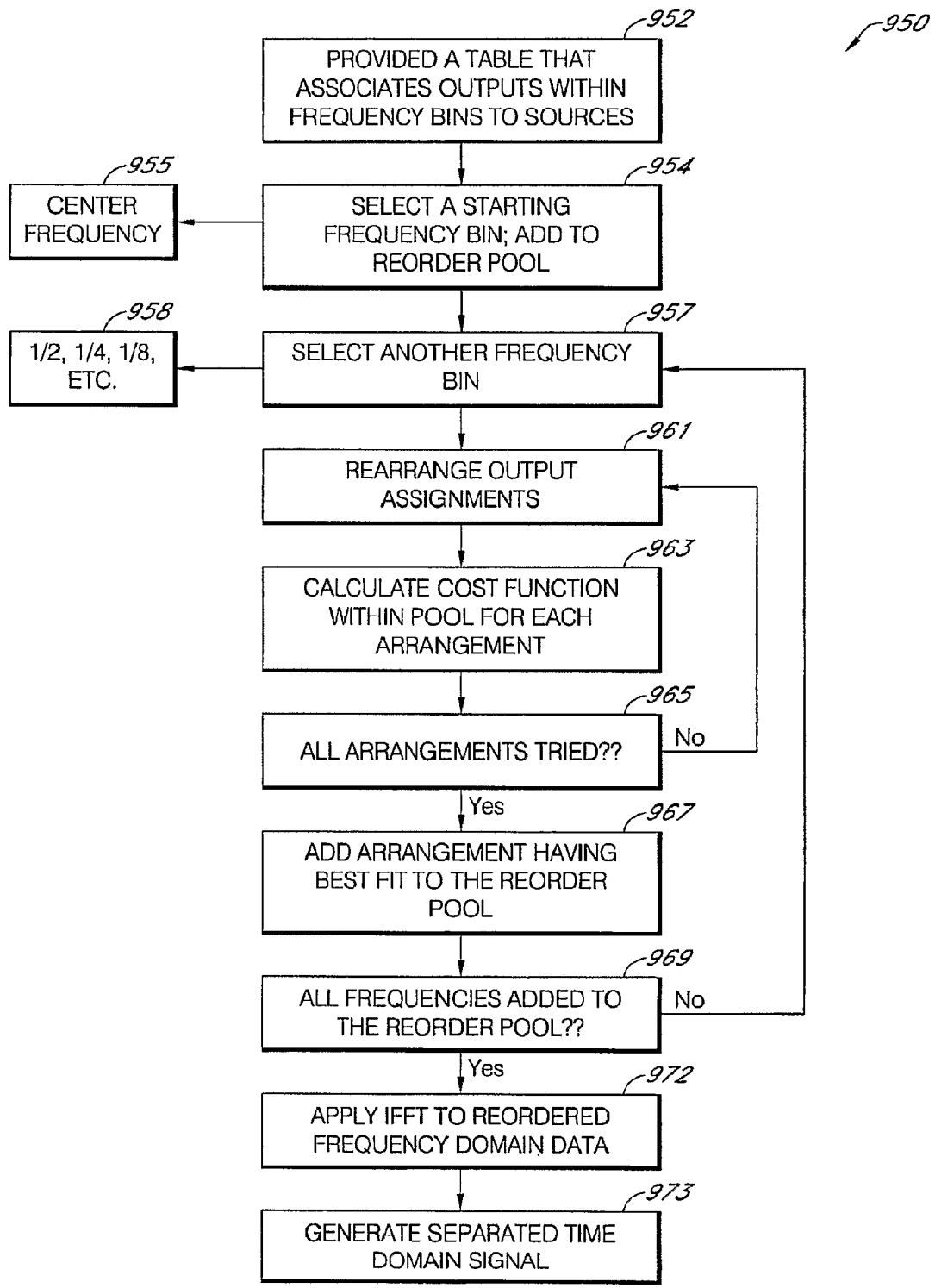
FIG. 20 is a flowchart of one embodiment of a process for reordering a permutation table with a signal separation process.

In some embodiments, the present invention relates to a process for rearranging a permutation table, as shown in FIG. 20. Process 950 begins at step 952, where a table that associates outputs within frequency bins is provided to signal sources. At step 954 of the process 950, starting frequency bin is selected and added to a reorder pool. In one example, process 950 includes step 955, where the starting frequency is chosen as the center. At step 957 of the process 950, another frequency bin is selected, which may be half frequencies, followed by quarter frequencies, followed by ⅛ frequencies, etc (958). At step 961 of the process 950, the source assignments for the outputs are rearranged in the selected frequency bin, and at step 963 of the process 950, a cost function is calculated within the pool for each arrangement. At step 967 of the process 950, it is determined whether all arrangements have been tried. If all arrangements have not been tried then process 950 continues by repeating steps 961, 963 and 965. Otherwise, process 950 continues at step 967, where the arrangement having the best fit is added to the reorder pool. At step 969 of the process 950, it is determined whether all frequencies have been added to the reorder pool. If all frequencies have not been added then process 950 continues by repeating steps 957, 961, 963, 965, 967 and 969. Otherwise process 950 continues at step 972, wherein the reordered pool is sent to an IFFT. Process 950 may continue at step 973 wherein time domain signals are generated.

Figure 21:
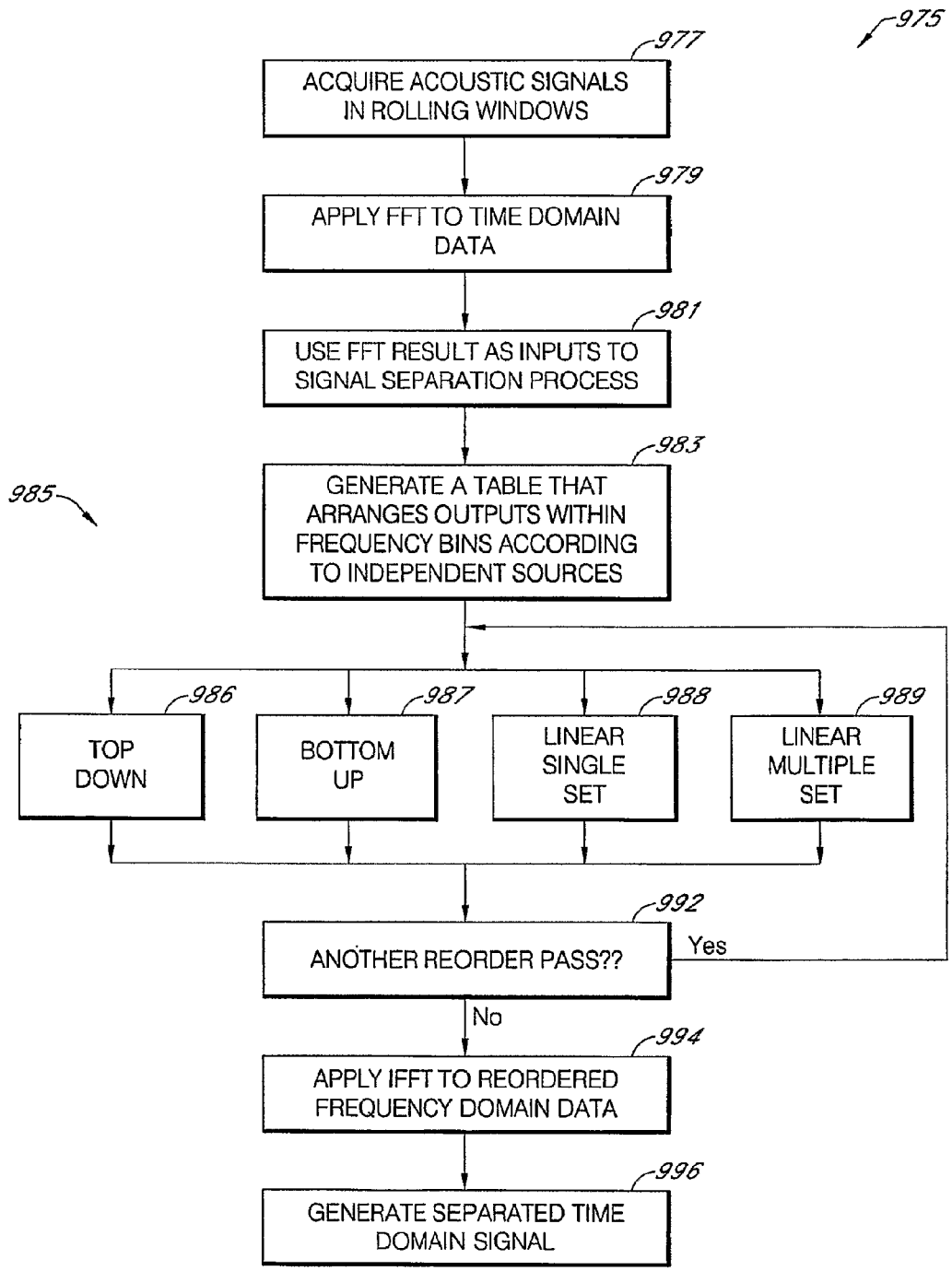
FIG. 21 is a flowchart of one embodiment of a process for reordering a permutation table with a signal separation process.

In some embodiments, the present invention relates to a process for rearranging a permutation table, as shown in FIG. 21. Process 975 begins at step 977, where acoustic signals may be acquired in rolling windows. At step 979 of the process 975, an FFT may be applied to the windows, and at step 981 of the process 975, the FFT results are used as input to a signal separation process. At step 983 of the process 975, a table is generated that arranges outputs within frequency bins according to sources. The table may be reordered as shown at 985. More particularly, a top-down process may be applied as shown in the block 986, a bottom-up process may be applied as shown in block 987, a linear single set may be applied as shown in block 988, and/or a linear multiple set may be applied as shown in block 989. The specifics of each of the reordering process have been discussed previously, so will not be addressed in detail. Process 975 continues at step 992, where it is determined whether another reorder pass will be made. If so, process 975 repeats at block 985. It may be desirable to perform multiple linear single set processes 988, for example, or multiple linear multiple sets 989. It will be understood that different combinations of single and multiple set linear processes may be used. In another example, a top-down 986 or bottom-up 987 process may be first applied, and then a linear process applied. However, it will be appreciated that the top-down 986 and bottom-up 987 processes typically are mutually exclusive, and that the top-down 986 or bottom-up 987 processes are typically not applied after using a linear process. If, at step 992, no additional reorder pass is to be performed, process 975 continues at step 994, where an IFFT is applied to reordered frequency domain data. At step 996 of process 975, a separated time domain signal is generated.

In the above sections, it has been mentioned that a given permutation of a frequency bin such as 656 in FIG. 13A, or a group of frequency bins as block 752 in FIG. 15A are evaluated based on the resulted sum of "global correlation" cost function on all sources, when that permutation is chosen. This sum is referred as the "grand global correlation cost function". Referring to FIG. 12, this global correlation cost function measures within one source, say source 2, the coherence among the frequencies as the sample window roll forward over time. When the complex valued Q's (block 609) from one frequency co-activate with the complex valued Q's from another frequency, these two frequencies would have a high correlation and are said to be coherent. A global correlations cost function on a set of frequencies could be the sum of coherence measures over all frequency pairs within the set. This could also be sum of coherence measure over all frequency triplets within the set. It would be appreciated that any form of cost function that reflects the coherence among frequencies can be used by processes 700, 775, 850 and 950 to determine the best fit permutation of a frequency bin or a group of frequency bins. For example, the Independent Vector Analysis cost function as described in (Taesu Kim, Hagai Attias, Soo-Young Lee, and Te-Won Lee, "Blind source separation exploiting higher-order frequency dependencies," IEEE Trans. Speech Audio Processing, vol. 14, no. 1, 2006, which is herein incorporated by reference in its entirety) may be used to measure coherence for permutation optimization. It should be noted that the global correlation cost function needs not be defined on all frequencies within a source. The cost function can be applied to any set of frequencies. This set may refer to all frequencies 604 within a source in FIG. 12. This set may also be a group of two frequencies as block 805, or a group of four frequencies as block 806 or similar.

Let the input signal be represented in the frequency domain as $X(\omega,l)$. Here $X(\omega,l)=[X_1(\omega,l),\ldots,X_M(\omega,l)]^T$ is a complex valued vector with each element representing each input of the M channels. $\omega$ represents the frequency and l is the window index. After signal separation, the output is represented as $Y(\omega,l)=[Y_1(\omega,l),\ldots,Y_N(\omega,l)]^T$ meaning there are N output channels.

In one embodiment, the coherence function for a group $\omega_a$ of frequencies is $$K_n(\omega_a) = -\Sigma_l \sqrt{\Sigma_{\omega \in \omega_a} |Y_n(\omega,l)|^2} \qquad \text{Eq. 7,}$$

the coherence function for two groups $\omega_a$, $\omega_b$ of frequencies is $$K_n(\omega_a, \omega_b) = -\Sigma_l \sqrt{\Sigma_{\omega \in \{\omega_a, \omega_b\}} |Y_n(\omega,l)|^2} \qquad \text{Eq. 8,}$$

the grand coherence function for a group $\omega_a$ of frequencies is just the sum of the coherence function over all output channels.

$$K(\omega_a) = \Sigma_n K_n(\omega_a) \qquad \text{Eq. 9,}$$

the global coherence function is $$K_n = K_n(\omega_a), \omega_a = \{1,2,\Lambda,\Omega\} \qquad \text{Eq. 10,}$$

where $\Omega$ is the total number of frequency bins, and the grand global coherence function is $$K = \Sigma_n K_n \qquad \text{Eq. 11.}$$

In another embodiment, the correlation function between two frequencies $\omega_1$, $\omega_2$ for one output channel n is defined as $$C_n(\omega_1, \omega_2) = -\Sigma_l |Y_n(\omega_1,l)| \cdot |Y_n(\omega_2,l)| \qquad \text{Eq. 12,}$$

the correlation cost function between the two groups $\omega_a$, $\omega_b$ of frequencies is $$C_n(\omega_a, \omega_b) = \sum_{\omega_1 \in \omega_a} \sum_{\omega_2 \in \omega_b} C_n(\omega_1, \omega_2), \qquad \text{Eq. 13}$$

and the grand global correlation for all output channels for two groups $\omega_a$, $\omega_b$ of frequencies is $$C(\omega_a, \omega_b) = \Sigma_n C_n(\omega_a, \omega_b) \qquad \text{Eq. 14}$$

When the two groups each contain the full set of frequencies, the correlation function becomes the global correlation of one channel.

$$C_n = C_n(\omega_a, \omega_b), \omega_a = \omega_b = \{1,2,\Lambda,\Omega\} \qquad \text{Eq. 15,}$$

and the grand global correlation for all output channels and all frequencies is $$C = \Sigma_n C_n \qquad \text{Eq. 16}$$

The Linear approach for frequency permutation correction, in the Linear approach, the frequencies may be scanned over, and for each frequency, the elements of vector $Y(\Omega,l)$ is permuted to optimize K or C. We may permute g neighbor frequencies together to optimize K or C when we scan through the frequencies. A pseudo code for the linear approach is:

```
1) for g = 1 to g_max do
2)   for ω = 1 to Ω-g
3)     ω_g = [ω,..., ω+g-1]
4)     Permute Y(ω_g,l) together to optimize K (or C)
5)   end for
6) end for
```

The Bottom up approach for frequency permutation correction may include permuting a pair of neighboring frequencies $\omega_a = \{\omega_1, \omega_2\}$ to optimize $K(\{\omega_1, \omega_2\})$ or $C(\omega_1, \omega_2)$. This may be repeated for other pairs. Next, a neighboring pair of a pair $\omega_a$, $\omega_b$ may be permuted to optimize $K(\{\omega_a, \omega_b\})$ or $C(\{\omega_a, \omega_b\})$. This process may be repeated for other pairs of pair. Next a neighboring pair of a pair of a pair is permuted to optimize their K or C. This is repeated until no more pairs of a pair of a pair ... can be formed. A pseudo code is given below:

```
1) g = 2
2) while g/2 < Ω do
3)   for ω = 1 to Ω step g do
4)     ω_a = {ω,... ω +g/2-1}, ω_b = {ω +g/2,... ω + g-1}
5)     Permute Y(ω_b,l) together to optimize K({ω_a, ω_b}) (or C ({ω_a, ω_b}))
6)   end for
7)   g = 2g
8) end while
```

The Top-down approach may start with a pool with only the center frequency, then adding one quarter frequency at a time to the pool. The newly added frequency may be permuted to optimize $K(\omega_a)$ or $C(\omega_a)$ for the group $\omega_a$ of frequencies in the pool. A pseudo code is given below

```
1) g = (Ω-1)/2, ω_a={g}
2) while g > 1 do
3)   for ω = g/2 to Ω-1 step g do
4)     add ω to ω_a
5)     Permute Y(ω,l) to optimize K(ω_a) or C(ω_a)
6)   end while
```

Devices

Any method or process herein may be incorporated into a device. Steps of the processes may be included as modules or sub-modules of the device. In some embodiments, the device is a speech device. The speech devise may be a headset, a wireless mobile handset or a telephone. The device may include one or more microphone. The device may include an array of microphones.

The device may also be a medical device. For example, the device may be used to separate EKG or EEG data.

A method, process, or system described herein may be used to process data in real time or may be used to post-process data.

In some embodiments, the present invention relates to software or a computer containing modules to perform a process or method described herein. The computer may comprise memory, a processor, and/or a display. The computer may be connected to another device described herein, such as a headset.

It will be understood that embodiments of the present invention include processes described herein, in which steps have been omitted, added, or rearranged.

What is claimed is:

1. A signal separation method, implemented within an electronic system, comprising:

receiving, in an electronic system, a set of frequency-domain first signals, wherein each of the frequency-domain first signals comprises frequency-domain first signal elements corresponding to a plurality of frequencies, and wherein the set of frequency-domain first signals are derived from one or more of a plurality of signal sources;

separating, in an electronic system, the set of frequency-domain first signals into a set of frequency-domain second signals, wherein the set of frequency-domain second signals comprises a set of separated frequency-domain second signal elements corresponding to individual frequencies of the plurality of frequencies, and wherein each frequency-domain second signal element is assigned an identifier which indicates which of the set of frequency-domain second signals includes the frequency-domain second signal element, and reordering, in an electronic system, the identifiers corresponding to at least one frequency to improve a coherence of the frequency-domain second signals by comparing each second signal element in the set of frequency domain second signals to another signal element to produce a set of frequency-domain third signals, wherein the improving the coherence of the frequency-domain second signals comprises: optimizing the coherence of frequency-domain second signal elements corresponding to a first subset of frequencies; and optimizing the coherence of frequency-domain second signal elements corresponding to a second subset of frequencies, wherein the second subset of frequencies includes more frequencies than the first subset of frequencies, and wherein the second subset of frequencies comprises the first subset of frequencies.

2. The method of claim 1, wherein the separating the set of frequency-domain first signals comprises a blind-source separation method.

3. The method of claim 2, wherein the blind-source separation method is applied to the frequency-domain first signal elements corresponding to individual frequencies.

4. The method of claim 1, wherein the coherence comprises a function that reflects the co-activity of signals at different frequencies.

5. The method of claim 1, wherein the improving the coherence of the frequency-domain second signals comprises optimizing the coherence of the frequency-domain second signals.

6. The method of claim 1, wherein the improving the coherence of the frequency-domain second signals comprises improving the coherence of a pair of adjacent frequency-domain second signal elements.

7. The method of claim 6, wherein the reordering the identifiers comprises reordering the identifiers corresponding to a plurality of frequencies, and wherein the reordering the identifiers further comprises sequentially reordering the identifiers from a low frequency of the plurality of frequencies to a high frequency of the plurality of frequencies.

8. The method of claim 6, wherein reordering the identifiers comprises reordering the identifiers corresponding to a plurality of frequencies, and wherein the reordering the identifiers further comprises improving the coherence between non-overlapping pairs of frequency-domain second signal elements.

9. The method of claim 1, further comprising transforming, in an electronic system, a set of time-domain input signals to produce the set of frequency-domain first signals.

10. The method of claim 9, wherein the time-domain input signals are acoustic signal mixtures.

11. The method of claim 10, wherein at least one of the acoustic signal mixtures comprises a speech signal.

12. The method of claim 1, further comprising inverse transforming a frequency-domain third signal of the set of frequency-domain third signals to produce a desired signal.

13. A computer-implemented system for separating signals, comprising:
a receiver that is configured to receive a set of time-domain input signals;
a transformer module implemented in the system that is configured to transform the set of time-domain input signals to a set of frequency-domain first signals, wherein each of the frequency-domain first signals comprises frequency-domain first signal elements corresponding to a plurality of frequencies, and wherein the set of frequency-domain first signals comprises a plurality of signal sources;
a frequency-domain signal separator module implemented in the system that is configured to separate the set of frequency-domain first signals into a set of frequency-domain second signals, wherein the set of frequency-domain second signals comprises a set of separated frequency-domain second signal elements corresponding to individual frequencies of the plurality of frequencies, and wherein each frequency-domain second signal element is assigned an identifier which indicates which of the set of frequency-domain second signals includes the frequency-domain second signal element, and
a reordering module implemented in the system that is configured to reorder the identifiers corresponding to at least one frequency to improve a coherence of the frequency-domain second signals by comparing each second signal element in the set of frequency domain second signals to another signal element to produce a set of frequency-domain third signals, wherein the reordering module comprises:
a first module implemented in the system that is configured to determine a first subset of the frequency-domain second signal elements to be reordered by determining the corresponding frequency;
a second module implemented in the system that is configured to improve the coherence of frequency-domain second signal elements corresponding to a pre-determined frequency with frequency-domain second signal elements corresponding to a frequency adjacent to the pre-determined frequency; and
a third module implemented in the system that is configured to determine subsequent frequency-domain second signal elements to be reordered.

14. The system of claim 13, wherein the frequency-domain signal separator module is configured to separate the set of frequency-domain first signals by using an Independent Component Analysis method or Independent Vector Analysis method.

15. The system of claim 13, and
wherein the third module is further configured to determine subsequent frequency-domain second signal elements as those corresponding to a frequency adjacent to a frequency corresponding to previously reordered frequency-domain second signal elements.

16. The system of claim 13, further comprising an inverse transformer module that is configured to inversely transform a frequency-domain third signal of the set of frequency-domain third signals to produce a desired signal.

17. The system of claim 13, wherein the system comprises a headset.

18. The system of claim 13, wherein the system comprises a telephone.

19. The method of claim 1, wherein the reordering the identifiers is done in pairs, wherein the second member of the pair is always fixed.

20. The method of claim 1, wherein the reordering the identifiers is done in pairs, wherein one member of the pair is always fixed.

* * * * *